United States Patent
King et al.

(10) Patent No.: US 11,303,315 B2
(45) Date of Patent: Apr. 12, 2022

(54) MAGNETIC CASE AND FOLIO FOR PORTABLE PERSONAL COMPUTING DEVICE

(71) Applicants: Matthew King, Marina Del Ray, CA (US); Matthew Malone, Santa Monica, CA (US)

(72) Inventors: Matthew King, Marina Del Ray, CA (US); Matthew Malone, Santa Monica, CA (US)

(*) Notice: Subject to any disclaimer, the term of this patent is extended or adjusted under 35 U.S.C. 154(b) by 0 days.

(21) Appl. No.: 17/224,683

(22) Filed: Apr. 7, 2021

(65) Prior Publication Data

US 2022/0029654 A1 Jan. 27, 2022

Related U.S. Application Data

(60) Provisional application No. 63/055,010, filed on Jul. 22, 2020.

(51) Int. Cl.
| | |
|---|---|
| *A45C 11/00* | (2006.01) |
| *H04B 1/3888* | (2015.01) |
| *A45C 13/00* | (2006.01) |
| *A45C 13/10* | (2006.01) |

(52) U.S. Cl.
CPC ............ *H04B 1/3888* (2013.01); *A45C 11/00* (2013.01); *A45C 13/005* (2013.01); *A45C 13/1069* (2013.01); *A45C 2011/002* (2013.01); *A45C 2011/003* (2013.01)

(58) Field of Classification Search
CPC ... A45C 11/00; A45C 13/005; A45C 13/1069; A45C 2011/002; A45C 2011/003

USPC ................................................. 206/320, 37
See application file for complete search history.

(56) References Cited

U.S. PATENT DOCUMENTS

| | | | |
|---|---|---|---|
| 8,724,300 B2* | 5/2014 | Smith ................... | G06F 1/1628 361/679.01 |
| 8,807,333 B1* | 8/2014 | Cooper ................... | A45C 11/00 206/45.23 |
| 9,379,759 B2* | 6/2016 | Platt ...................... | H04B 1/3888 |
| 9,634,711 B2* | 4/2017 | Sirichai ................. | A45C 11/00 |
| 2012/0268891 A1* | 10/2012 | Cencioni ................ | G06F 1/1626 361/679.55 |
| 2014/0034521 A1* | 2/2014 | Liu ........................ | A45C 11/00 206/45.23 |
| 2015/0001105 A1* | 1/2015 | Nyholm ................. | G06F 1/1628 206/45.2 |

\* cited by examiner

*Primary Examiner* — King M Chu
(74) *Attorney, Agent, or Firm* — Tutunjian & Bitetto, P.C.

(57) ABSTRACT

Systems and methods are provided for attaching and positioning a personal computing device case to a folio. The folio includes magnetic connections, and the personal computing device case includes magnetic connections for attaching the case to the folio in any one of a plurality of positions. The magnetic connections of the folio include an upper magnet array and a lower magnet array for attachment of the magnetic case. The folio includes a hinge mechanism at a top edge of each of two sides of the folio. The case is attached to the folio using guided magnetic seating, and the case is repositionable by slidingly or rotationally changing the position of the case relative to the folio.

13 Claims, 22 Drawing Sheets

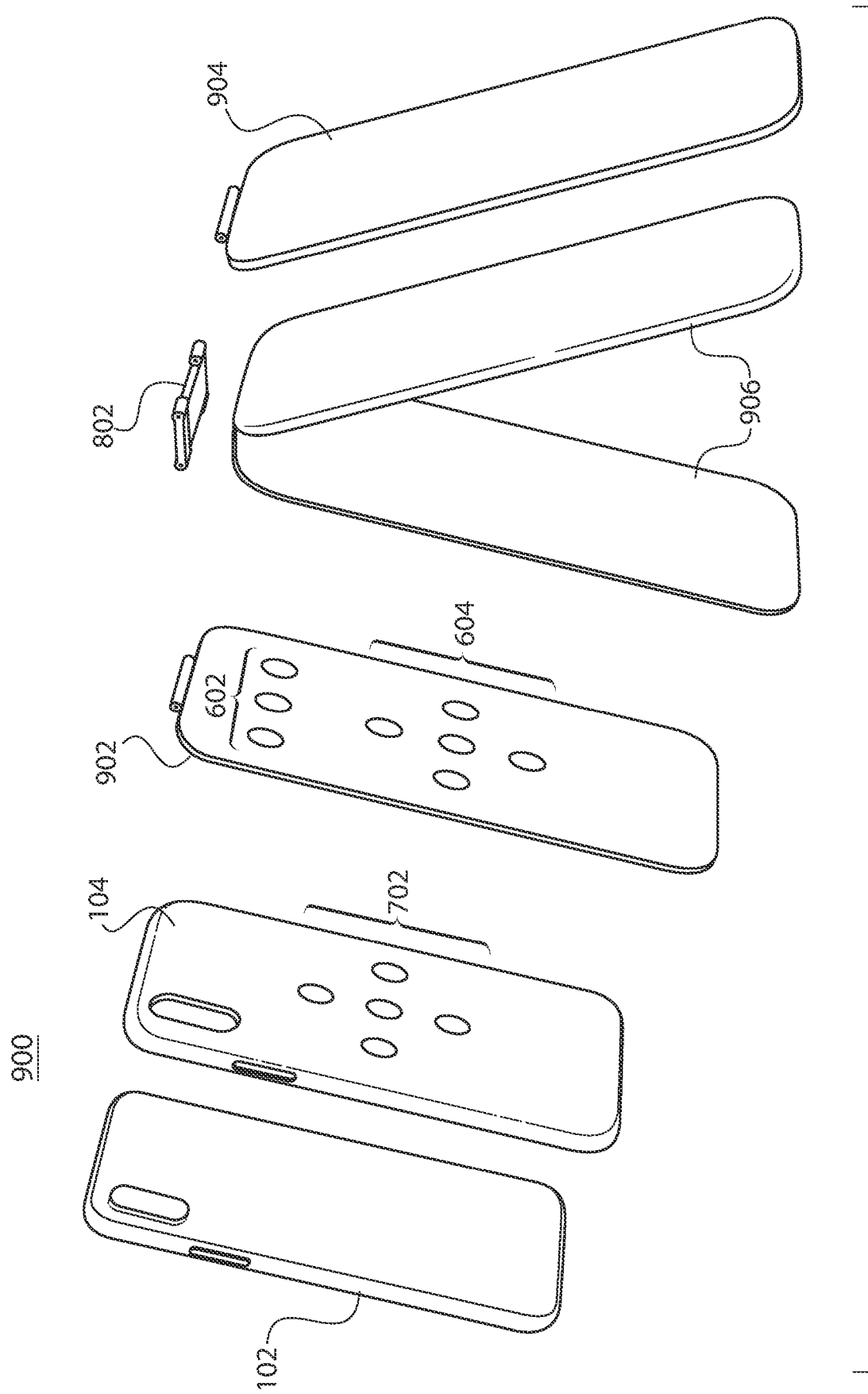

MAGNETIC CASE AND FOLIO FOR PORTABLE PERSONAL COMPUTING DEVICE

BACKGROUND

Technical Field

The present invention generally relates to a case and folio for a portable personal computing device (e.g., smartphone, tablet, phablet, etc.), and more particularly to a separable magnetic case and folio for a portable personal computing device.

Description of the Related Art

Various types of portable personal electronic devices are currently used for communication and entertainment purposes. Such devices include, for example, smartphones, tablet computers, laptop computers, electronic readers, personal digital assistants (PDAs), phablets, cameras, etc. These devices often include touchscreens, scroll wheels, switches, and other interactive control components. Such components are sensitive, and the devices are priced at a high cost, and thus, it is desirable to protect such devices from physical damage.

Conventional cases for protecting such devices include, for example, snap on cases and folio cases which cover the front and back of the device for protection. However, it is difficult to change orientation of the devices (e.g., smartphones) for viewing when placing the device on a surface (e.g., table, desk, counter, workout mat, etc.) as conventional devices often require complicated folding of a folio to change orientation and snap on cases which use a "kickstand" device are not sturdy and are easily knocked over with may cause damage to the personal electronic devices intended to be protected. Furthermore, such cases only are capable of two configurations (e.g., portrait and landscape), and thus, limit the placement/viewing field when they are placed on a surface for viewing.

SUMMARY

In accordance with an aspect of the present invention, an apparatus for securing a personal computing device is provided. The apparatus includes a folio with one or more folio magnetic connections, and a personal computing device case including one or more case magnetic connections for magnetically attaching the case to the folio in any of a plurality of positions.

In accordance with an aspect of the present invention, a magnetic personal computing device case and folio is provided. The folio includes an upper magnet array and a lower magnet array disposed on a front side of the folio, and the case includes a case magnet array disposed on a center portion of the case. The case magnet array is configured for magnetic attachment to the folio in any of a plurality of positions. The folio includes a link-hinge mechanism connecting the front side and the back side of the folio to facilitate opening and closing of the folio.

In accordance with an aspect of the present invention, a method for attaching and positioning a magnetic portable computing device case on a magnetic folio is provided. The method includes attaching the case to the folio using guided magnetic seating. A position of the case on the magnetic folio can be adjusted by slidingly changing a position of the case relative to the folio by sliding the case up or down a front side of the folio into a different position than an original position. A position of the case on the magnetic folio can be adjusted by rotationally changing a position of the case relative to the folio by rotating the case around a central axis of the folio into a differently rotated position than the original position.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 9 is an exploded perspective view showing components of a separable magnetic personal computing device case and folio with a portable personal computing device, in accordance with an aspect of the present invention;

DETAILED DESCRIPTION

Figure 1:
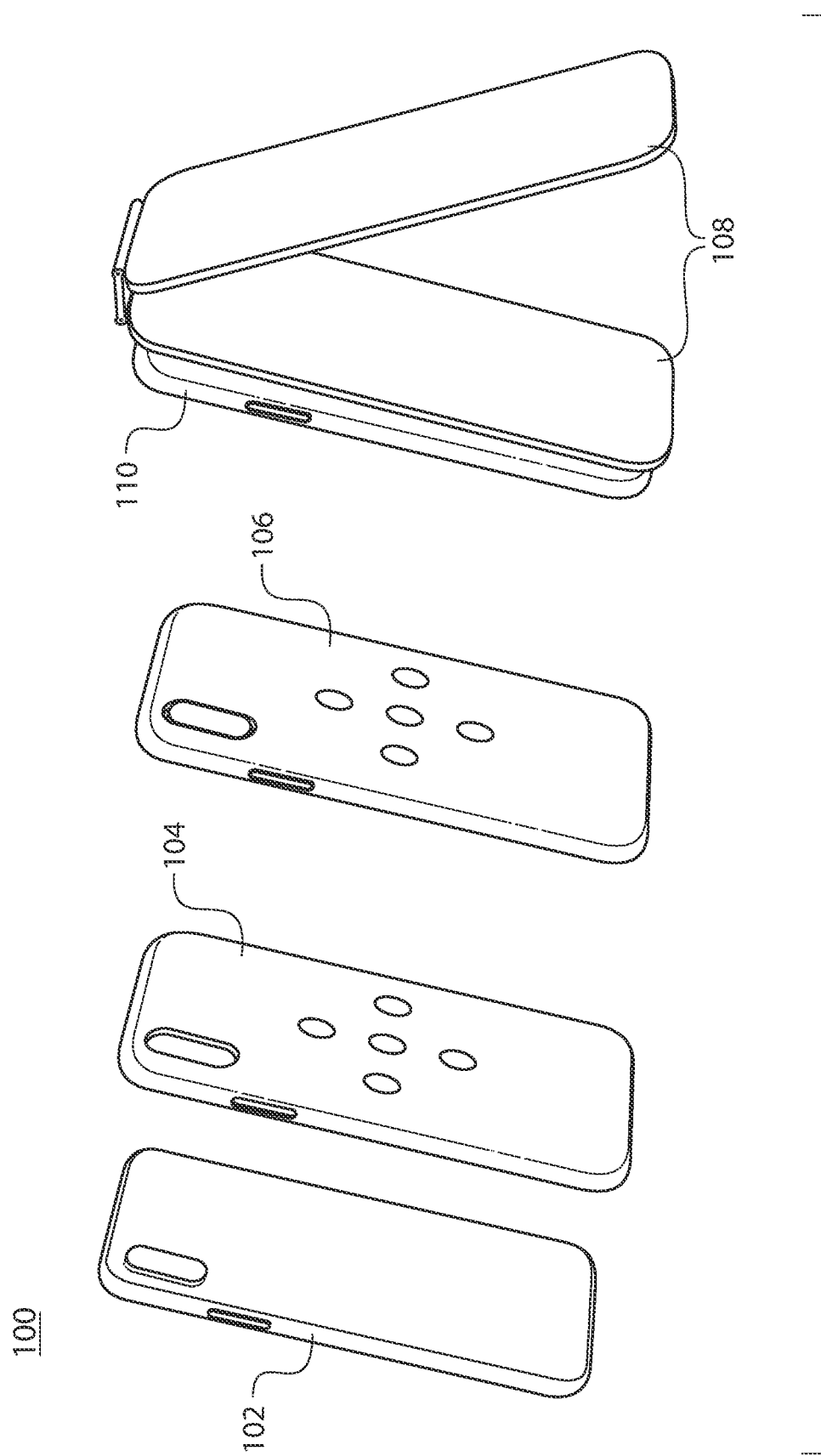
FIG. 1 is a high-level perspective view showing a separable magnetic personal computing device case and folio, in accordance with an aspect of the present invention.

The present invention generally relates to a case and folio for a portable personal computing device (e.g., smartphone, tablet, phablet, personal digital assistant (PDA), etc.), and more particularly to a separable magnetic case and folio for a portable personal computing device.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value can include at least that particular value, unless the context clearly dictates otherwise. Ranges may be expressed herein as from "about" or "approximately" one particular value and/or to "about" or "approximately" another particular value. When such a range is expressed, another embodiment can include from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings, in which like numerals represent the same or similar elements, and initially to FIG. 1 a high-level perspective view 100 showing a separable magnetic personal computing device case and folio is illustratively depicted in accordance with an embodiment of the present invention.

In accordance with various embodiments of the present invention, components of the magnetic personal computing device case 104 and folio 108 can be fabricated from any material suitable for a personal computing device case and/or folio, including, for example, plastics, metals, polymers, ceramics, semi-rigid/rigid materials, rubbers, silicone, Styrofoam, fabric, etc., as readily understood by one of ordinary skill in the art. Of course, in accordance with various embodiments, the magnetic personal computing device case 104 and folio 108 may also include other elements (not shown), and may be formed from any suitable materials, as readily contemplated by one of skill in the art, as well as omit certain elements.

In some embodiments, a personal computing device 102 (e.g., smartphone, PDA, tablet, laptop, phablet, camera, etc.) (referred to herein below as a "phone" for ease of illustration) can be inserted securely into a personal computing device case 104 configured to snugly fit any of a plurality of devices. The shape and configuration of the case 104 can be configured to fit any of a plurality of types of devices (e.g., iPhone®, Windows® phone, Samsung® phone, tablet, phablet, etc.) in accordance with various embodiments of the present invention. The phone 102 can be inserted into the case 104, as shown in block 106 with the phone 102 positioned in the case 104.

The phone positioned in the case 106 can be magnetically attached to a folio 108 by a folio magnetic connection (e.g., magnet array, described in further detail herein below with reference to elements 602 and 604 of FIG. 6) and a case magnetic connection 101 (e.g., magnet array). The folio magnet arrays 602, 604 and the case magnet array 101 can be in any of a plurality of configurations, examples of which are described in further detail hereinbelow with reference to FIG. 12. The attachment positioning can be any of a plurality of configurations (e.g., portrait mode, landscape mode, display mode, viewing mode, charging mode, etc.), with one such configuration (e.g., portrait mode) being shown in block 110 with the phone 102 positioned in the case 106 magnetically attached to the folio 108 in accordance with an aspect of the present invention.

Figure 2:
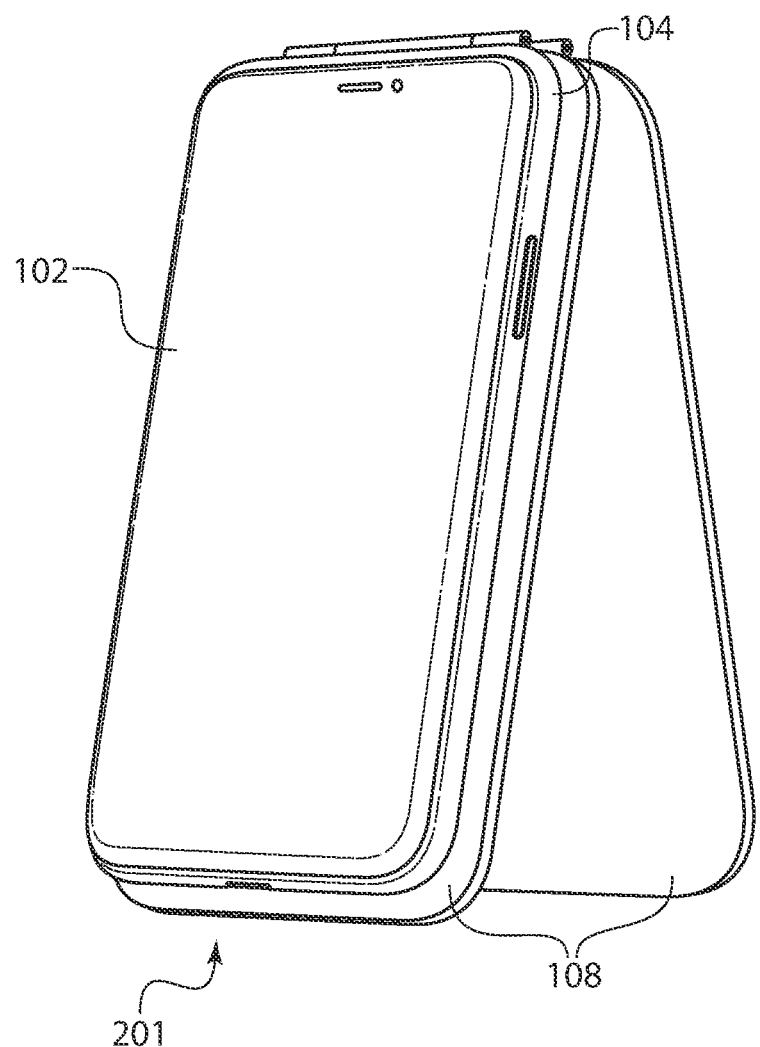
FIG. 2 is a perspective view showing assembled components of a separable magnetic personal computing device case and folio with a portable personal computing device positioned in portrait mode, in accordance with an aspect of the present invention.

Referring now to FIG. 2, a perspective view 200 showing assembled components of a separable magnetic personal computing device case and folio with a portable personal computing device positioned in portrait mode 201 is illustratively depicted in accordance with an embodiment of the present invention.

In one embodiment, the phone 102, case, 104, and folio 108 can be magnetically connected to each other using, for example, a magnet array, in portrait mode 201 (e.g., screen positioned such that the screen while viewing is taller than it is wide). The phone 102 can be attached (e.g., snapped-in) to the case 104, and the case 104 can be magnetically attached and detached from the folio 108 in accordance with aspects of the present invention.

Figure 3:
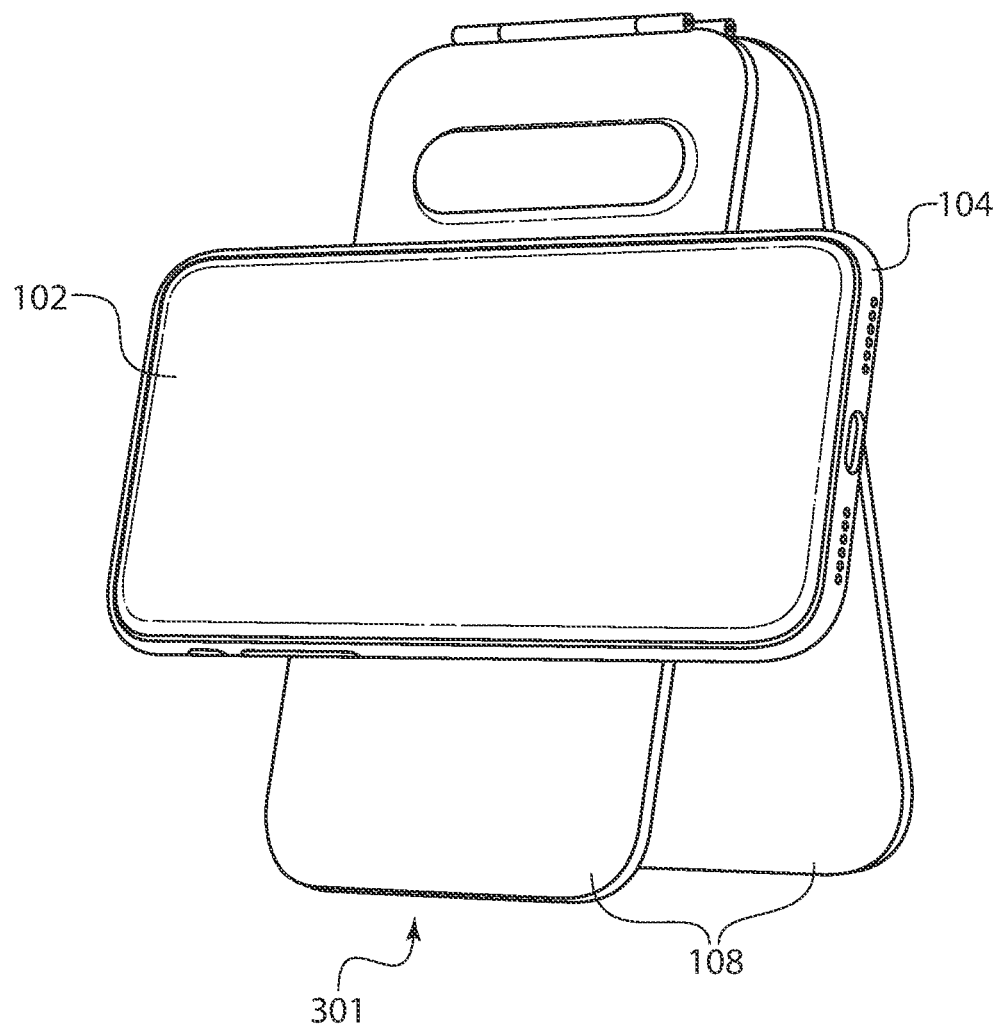
FIG. 3 is a perspective view showing assembled components of a separable magnetic personal computing device case and folio with a portable personal computing device positioned in landscape mode, in accordance with an aspect of the present invention.

Referring now to FIG. 3, a perspective view 300 showing assembled components of a separable magnetic personal computing device case and folio with a portable personal computing device positioned in landscape mode 301 is illustratively depicted in accordance with an embodiment of the present invention.

In one embodiment, the phone 102, case, 104, and folio 108 can be magnetically connected to each other using, for example, a magnet array, in landscape mode 301 (e.g., screen positioned such that the screen while viewing is wider than it is tall). The phone 102 can be attached (e.g., snapped-in) to the case 104, and the case 104 can be magnetically attached and detached from the folio 108 in accordance with an embodiment of the present invention. The folio 108 can include a magnetic connection (e.g., magnet array) positioned at and/or proximate to the center of the folio 108 to facilitate attachment in landscape mode 301 such that the phone 102 and case 104 are substantially centered on the folio 108 when magnetically connected in accordance with an aspect of the present invention.

Figure 4:
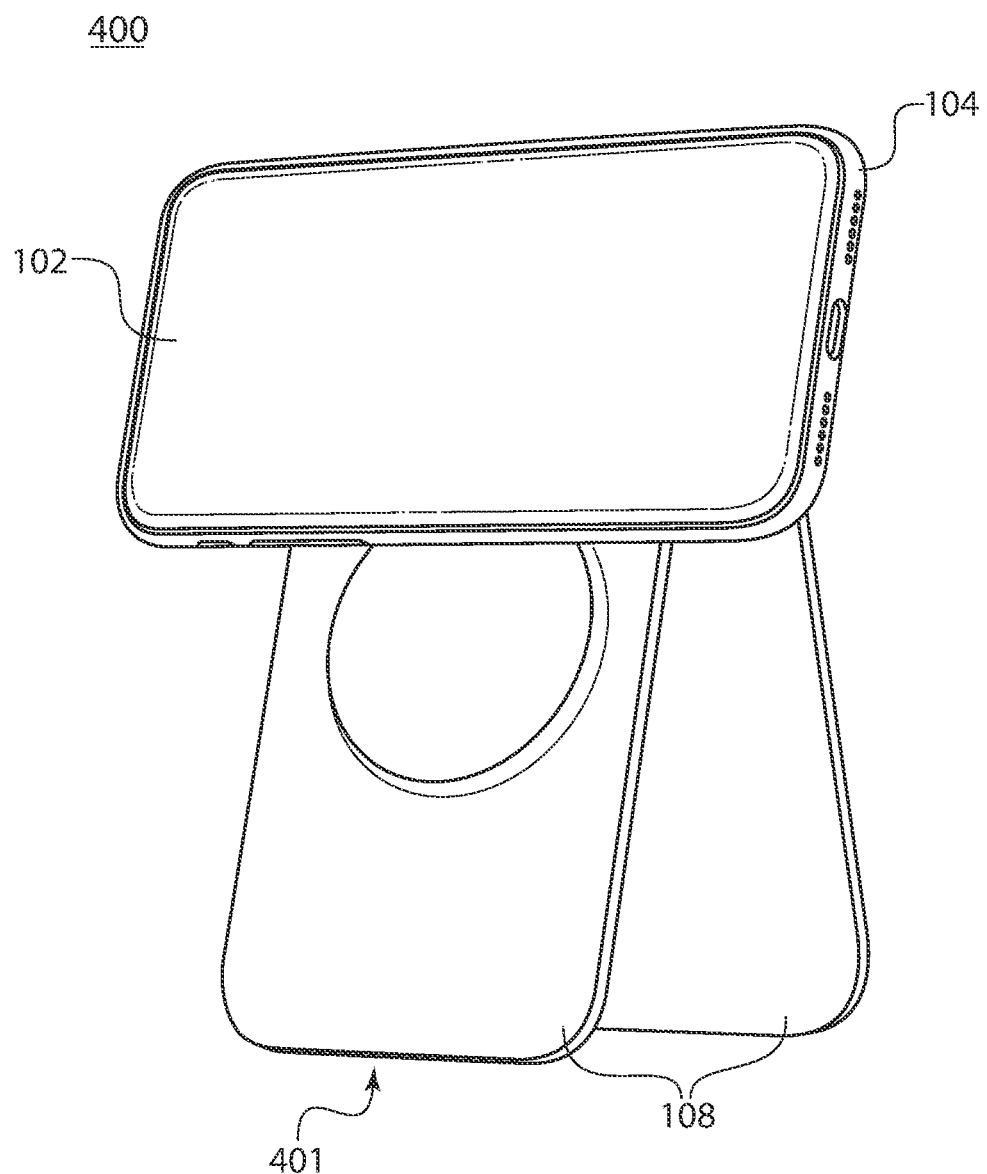
FIG. 4 is a perspective view showing assembled components of a separable magnetic personal computing device case and folio with a portable personal computing device positioned in display mode, in accordance with an aspect of the present invention.

Referring now to FIG. 4, a perspective view 400 showing assembled components of a separable magnetic portable computing device case and folio with a portable personal computing device positioned in display mode is illustratively depicted in accordance with an embodiment of the present invention.

In one embodiment, the phone 102, case, 104, and folio 108 can be connected to each other in accordance with aspects of the present invention in display mode 401 (e.g., phone 102 and case 104 positioned at or near the top of the folio 108 with the screen of the phone 102 positioned such that the screen while viewing is wider than it is tall). The phone 102 can be attached (e.g., snapped-in) to the case 104, and the case 104 can be magnetically attached and detached from the folio 108 in accordance with aspects of the present invention. The folio 108 can include a magnetic connection (e.g., magnet array) (not shown) at or near the top of the folio 108 in display mode 401 such that the phone 102 and case 104 are positioned at, near, or partially above the top of the folio 108 when magnetically connected in accordance with an aspect of the present invention.

Figure 5:
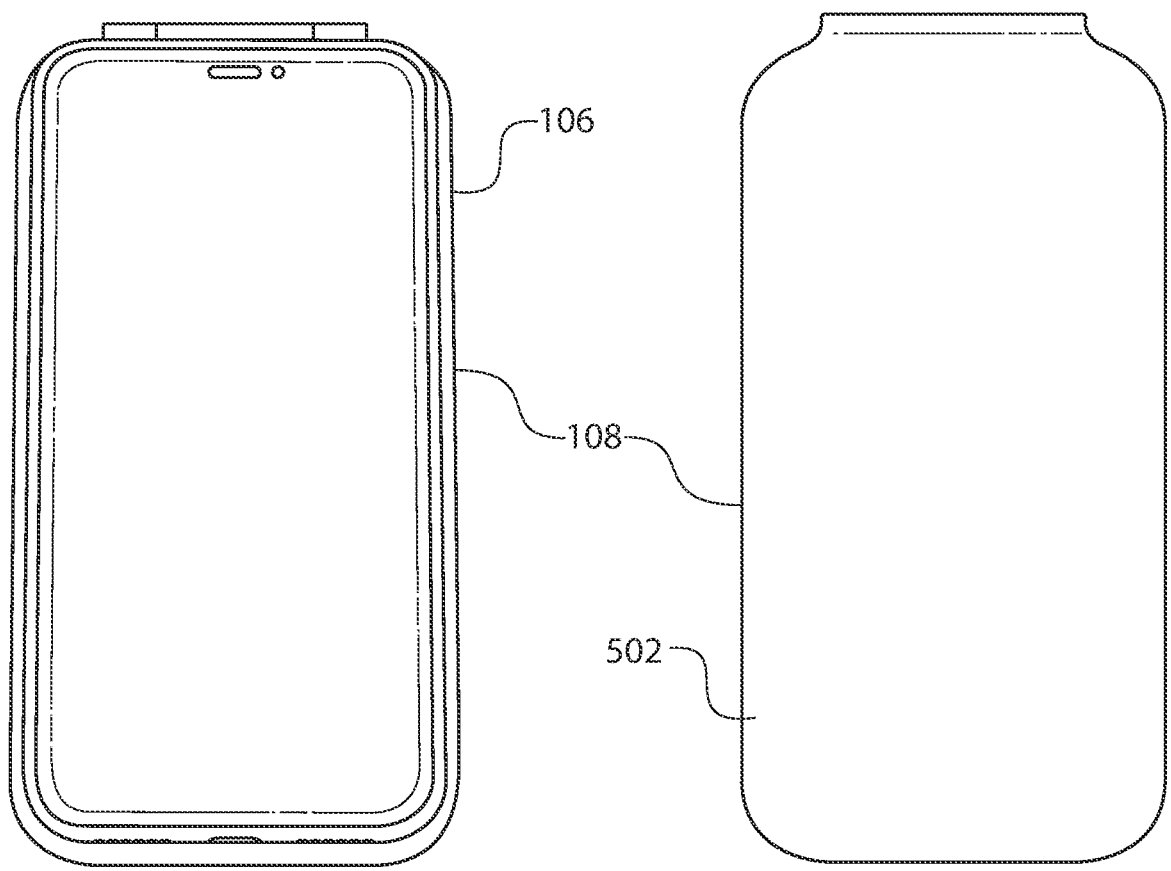
FIG. 5 is a perspective view showing opened and closed views of assembled components of a separable magnetic personal computing device case and folio with a portable personal computing device, in accordance with an aspect of the present invention.

Referring now to FIG. 5, a perspective view 500 showing opened and closed views of assembled components of a separable magnetic personal computing device case and folio with a portable personal computing device is illustratively depicted in accordance with an embodiment of the present invention.

In some embodiments (e.g., portrait mode) the phone in case 106 can be protected on the front and back sides by a folio 108. In the open state, the screen of the phone in case 106 can be viewed by flipping the folio front cover 502 over the top of the phone in case 106 to provide access to the phone in case 106 for a user. In the closed state, the folio front cover 502 covers the screen of the phone in case 106 for protection from damage, in accordance with an aspect of the present invention.

Figure 6:
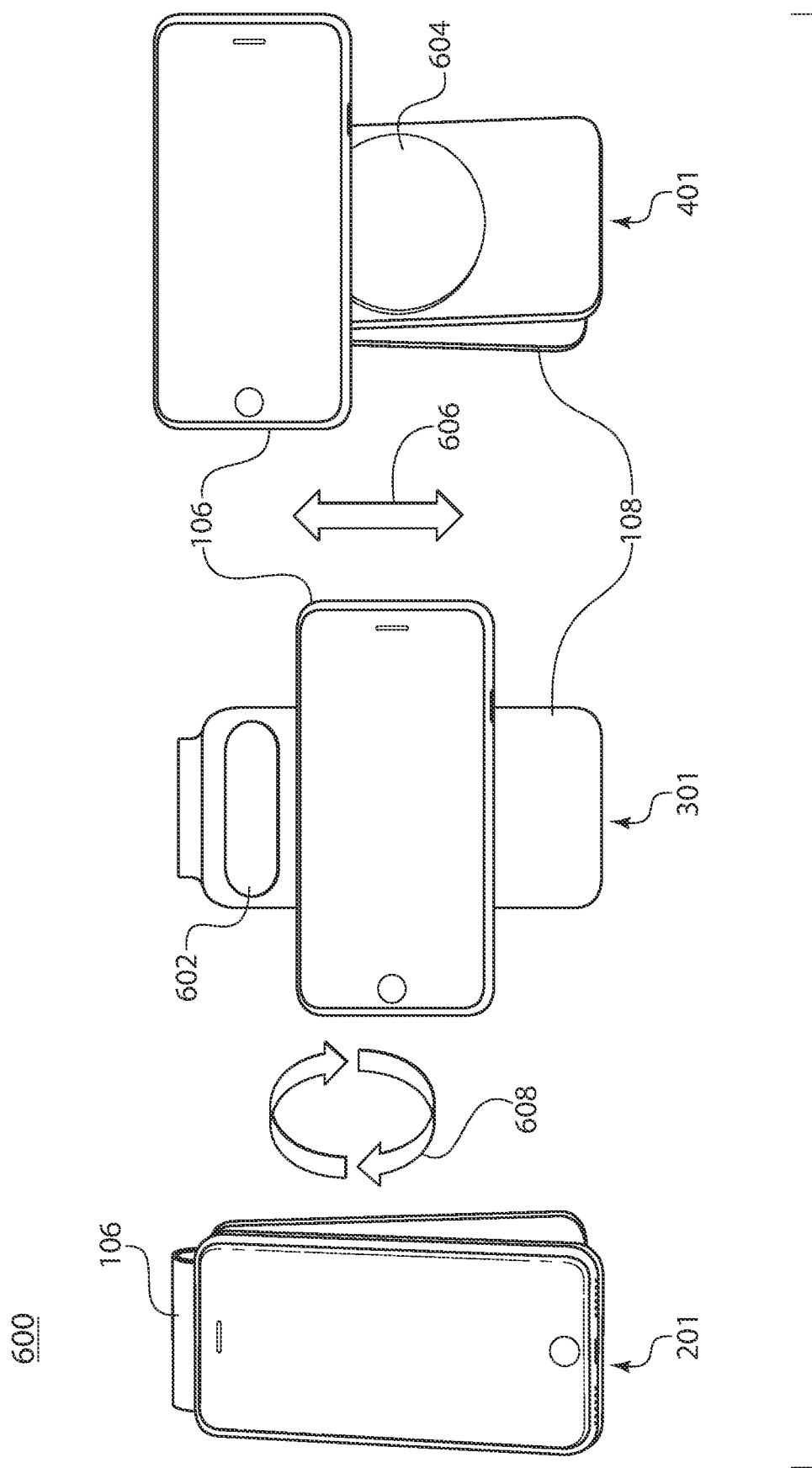
FIG. 6 is a perspective view showing assembled components of a separable magnetic personal computing device case and folio with a portable personal computing device configured for slidingly and/or rotationally changing position of a phone in the case relative to the folio, in accordance with an aspect of the present invention.

Referring now to FIG. 6, a perspective view 600 showing assembled components of a separable magnetic personal computing device case and folio with a portable personal computing device configured for slidingly and/or rotationally changing position of a phone in the case relative to the folio is illustratively depicted in accordance with an embodiment of the present invention.

In some embodiments, the folio 108 can include a front plate upper magnet array 602 and a front plate lower magnet array 604 for attaching the phone in case 106 for viewing in any of a variety of attachment configurations. Some examples of different attachment configurations are portrait mode 201 (e.g., attached using upper magnet array 602 and/or lower magnet array 604), display mode 401 (e.g., using the front plate upper magnet array 602) and landscape mode 301 (e.g., using the front plate lower magnet array 604) in accordance with embodiments of the present invention. Further examples of the different attachment modes are described in further detail herein below with reference to FIGS. 16A and 16B, in accordance with aspects of the present invention.

The phone in case 106 can be moved up and down on the folio 108 between the magnet arrays 602, 604 using a facilitated sliding action 606 to adjust from the positioning shown in element 301 (e.g., attached to lower magnet array 604) to the positioning shown in element 401 (e.g., attached to upper magnet array 602 in display mode) and vice versa. The phone in case 106 can be removed from the folio 108 and repositioned by placing the phone in case 106 onto the magnet arrays 602, 604, and can be rotated using a facilitated rotating action 608 to adjust from the positioning shown in element 301 and/or 401 to the positioning shown in element 201 (e.g., portrait mode), in accordance with various embodiments of the present invention.

Figure 7:
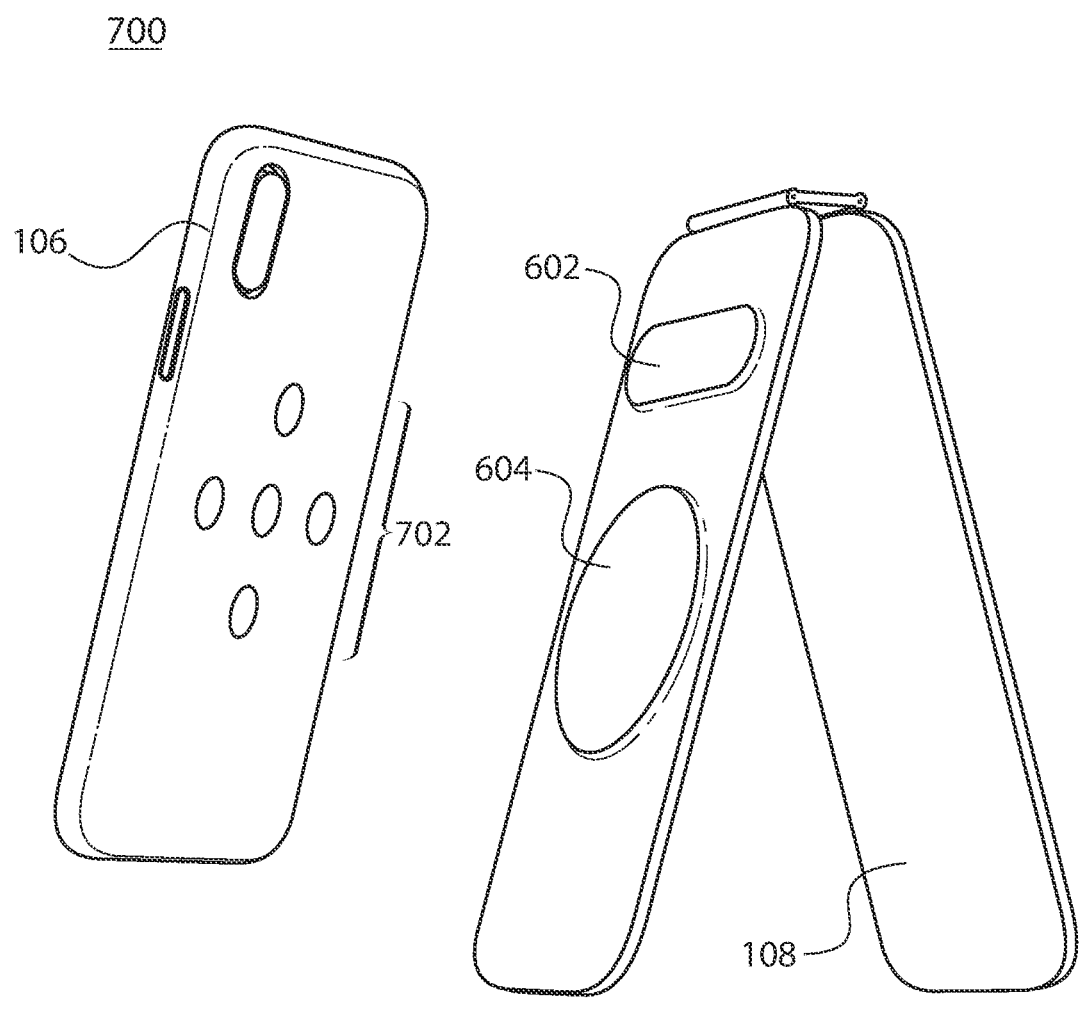
FIG. 7 is a perspective view showing magnet arrays in a separable magnetic personal computing device case and folio, in accordance with an aspect of the present invention.

Referring now to FIG. 7, a perspective view 700 showing magnet arrays in a separable magnetic personal computing device case and folio for a portable personal computing device is illustratively depicted in accordance with an embodiment of the present invention.

In some embodiments, the phone in case 106 can be connected to the folio 108 using a case magnet array 702 configured to magnetically connect to the front plate lower magnet array 604 or the front plate upper magnet array 602 in accordance with aspects of the present invention. The case magnet array 702 can be arranged in any of a plurality of configurations, including, for example, an exposed cross pattern with five (5) magnets (e.g., as depicted in FIG. 7), but it is to be appreciated that the case magnet array 702 can be hidden from view (e.g., positioned below a top layer of the case) and can include other configuration positions and numbers of magnets in the case magnet array 702 in accordance with various embodiments of the present invention.

Figure 8A:
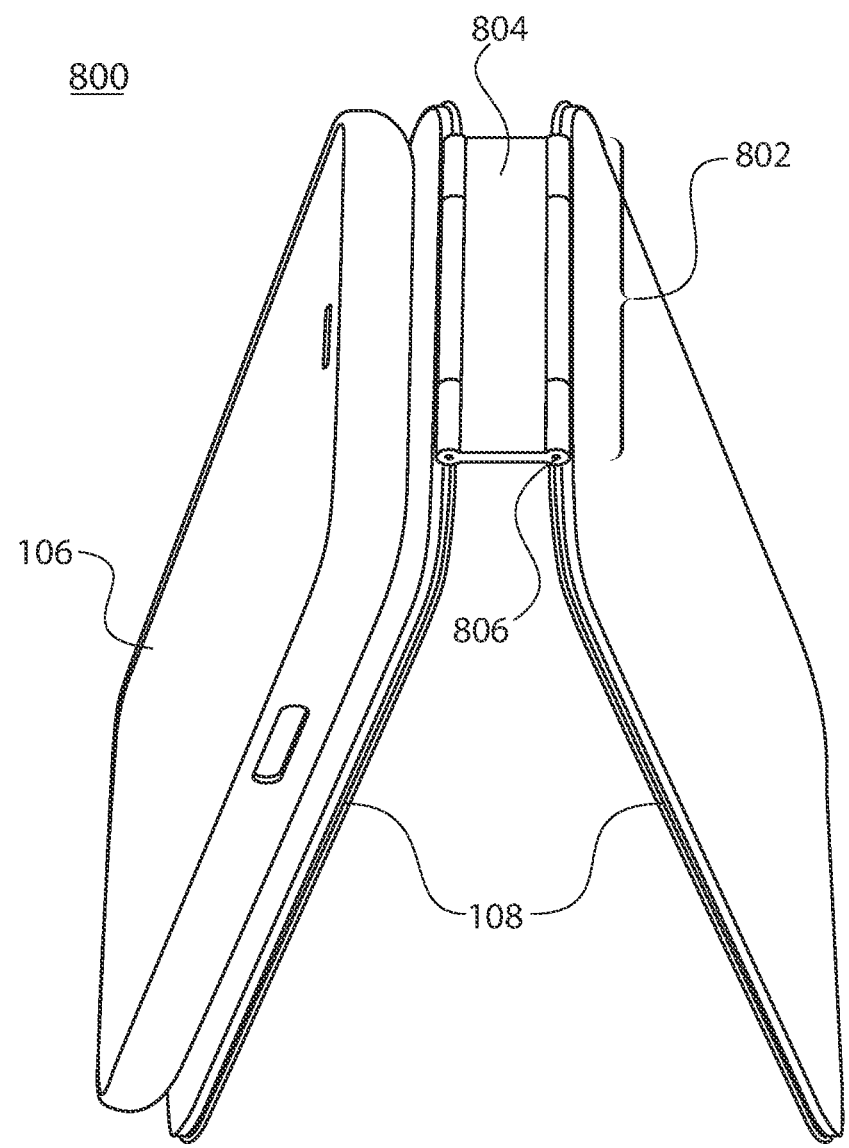
FIG. 8A is a perspective view showing assembled components of a folio hinge for a separable magnetic personal computing device case and folio with a portable personal computing device, in accordance with an aspect of the present invention.

Referring now to FIG. 8A, a perspective view 800 showing assembled components of a folio hinge mechanism 802 for a separable magnetic personal computing device case and folio with a portable personal computing device is illustratively depicted in accordance with an aspect of the present invention.

In some embodiments the folio 108 can be configured to support the phone in case 106, and can be opened and closed using a folio hinge mechanism 802. The hinge mechanism 802 can include a hinge spacing mechanism 804 for providing space to close over the phone in case 106, and can further include a hinge attachment mechanism 806 (e.g., pin) for securing each side of the folio 108 to the hinge mechanism 802 in accordance with aspects of the present invention.

Figure 8B:
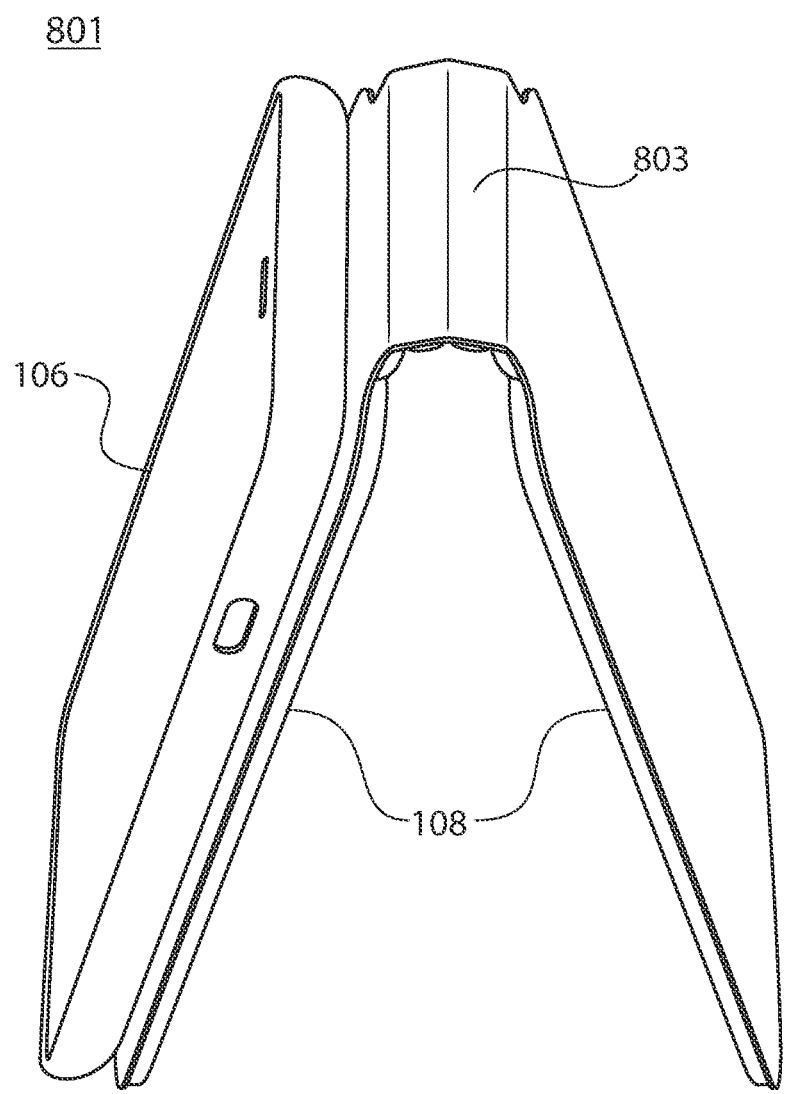
FIG. 8B is a perspective view showing assembled components of a folio hinge including a link-hinge mechanism for a separable magnetic personal computing device case and folio with a portable personal computing device, in accordance with an aspect of the present invention.

Referring now to FIG. 8B, a perspective view 801 showing assembled components of a link-hinge mechanism 803 for a separable magnetic personal computing device case and folio with a portable personal computing device is illustratively depicted in accordance with an embodiment of the present invention.

In some embodiments the folio 108 can be configured to support the phone in case 106 and can be opened and closed using a link-hinge folio hinge mechanism 803. The link-hinge mechanism 803 can include any of a plurality of different configurations of links, which are described in further detail herein below with reference to FIG. 11, and the link-hinge mechanism 803 is configured for securing the two sides of the folio 108 together. The link-hinge mechanism 803 can be fabricated from any material suitable for forming a link-hinge, including, for example, plastics, metals, polymers, ceramics, semi-rigid/rigid materials, rubbers, silicone, Styrofoam, fabric, etc., as readily understood by one of ordinary skill in the art, in accordance with various aspects of the present invention.

Referring now to FIG. 9, an exploded perspective view 900 showing components of a separable magnetic personal computing device case and folio with a portable personal computing device is illustratively depicted in accordance with embodiments of the present invention.

In some embodiments, a phone 102 can be inserted securely into a personal computing device case 104 configured to snugly fit any of a plurality of devices. The shape and configuration of the case 104 can be configured to fit any of a plurality of types of devices (e.g., iPhone®, Windows® phone, Samsung® phone, tablet, etc.) in accordance with various embodiments of the present invention. In accordance with some aspects of the present invention, customized cases (e.g., different sizes, cutouts for button/charging access, etc.) can be configured to fit particular individual devices (e.g., iPhone10®, iPad®, Samsung Galaxy®, Motorola®, etc.). The case 104 can include a case magnet array 702, which can be utilized to be magnetically connected to a folio front plate 902 using a front plate upper magnet array 602 and/or a front plate lower magnet array 604, in accordance with aspects of the present invention.

In some embodiments, the folio front plate 902 can be connected to a folio back plate 904 using a folio hinge 802, and the folio front plate 902 and the folio back plate 904 can be covered (e.g., for aesthetic appeal, covering magnets from view, improved grip, etc.) using a folio cover 906, with the folio cover 906 being made from any of a plurality of appropriate materials for holding, covering, and/or securing a phone 102 (e.g., plastic, fabric, polymer, rubber, etc.) in accordance with aspects of the present invention.

Figure 10:
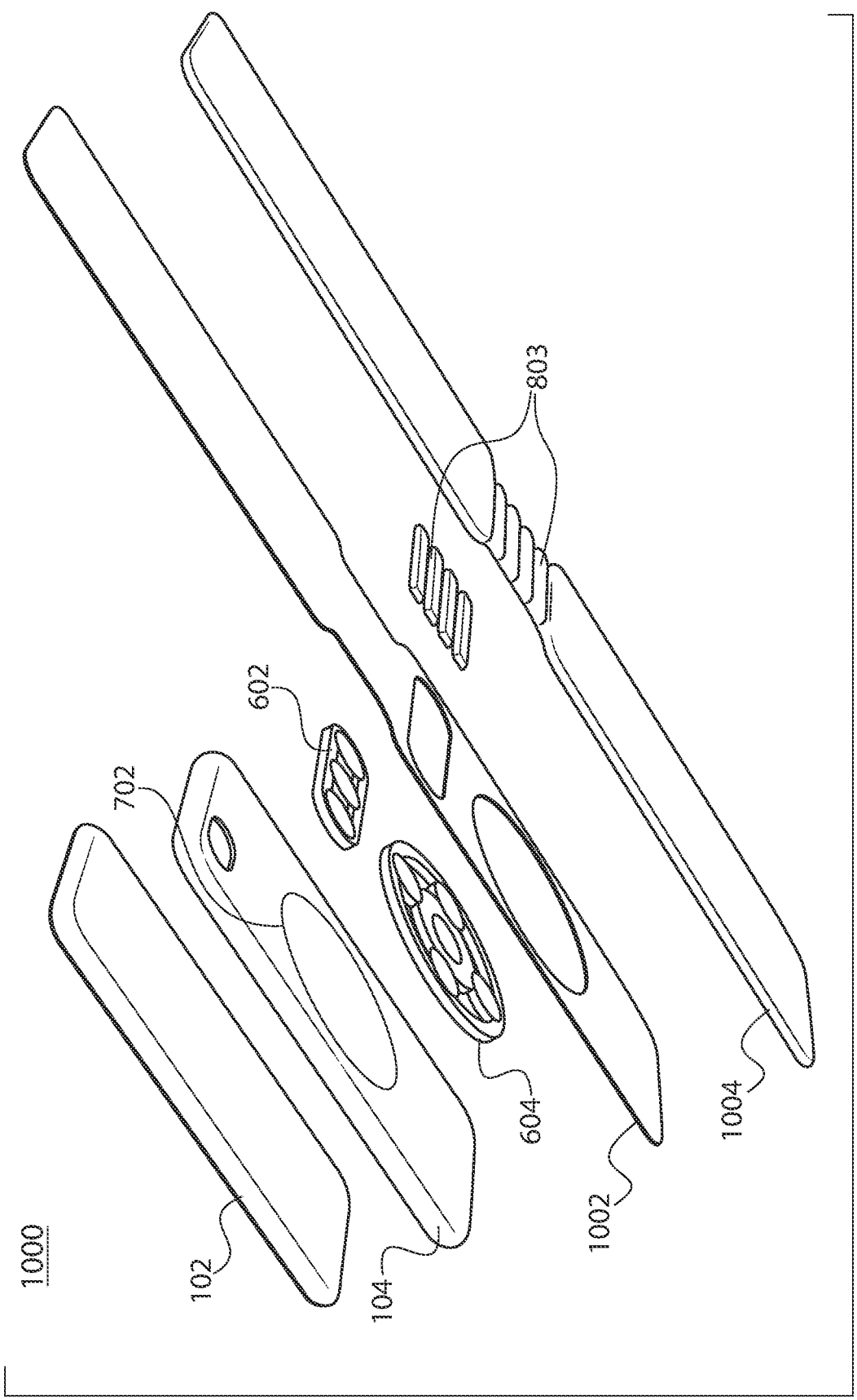
FIG. 10 is an exploded perspective view showing components of a separable magnetic personal computing device case and folio including a link-hinge mechanism with a portable personal computing device, in accordance with an aspect of the present invention.

Referring now to FIG. 10, an exploded perspective view 1000 showing components of a separable magnetic personal computing device case and folio including a link-hinge mechanism with a portable personal computing device is illustratively depicted in accordance with an aspect of the present invention.

In some embodiments, a phone 102 can be inserted securely into a personal computing device case 104 configured to snugly fit any of a plurality of devices. The shape and configuration of the case 104 can be configured to fit any of a plurality of types of devices (e.g., iPhone®, Windows® phone, Samsung® phone, tablet, etc.) in accordance with various embodiments of the present invention. In accordance with some aspects of the present invention, customized cases (e.g., different sizes, cutouts for button/charging access, etc.) can be configured to fit individual devices (e.g., iPhone10®, iPad®, Samsung Galaxy®, Motorola®, etc.). The case 104 can include a case magnet array 702, which can be utilized to be magnetically connected to a front plate upper magnet array 602 and/or a front plate lower magnet array 604. The magnet arrays 602, 604 can be positioned in cutouts of a molded interior panel 1002, and can be attached to a molded exterior panel 1004 using any of a plurality of suitable attachment means (e.g., glue, hook and loop fastener, welding, tape, snap-fit, etc.) in accordance with aspects of the present invention.

In accordance with aspects of the present invention, the molded exterior panel 1004 can include a link-hinge mechanism 803 connecting the two sides of the molded exterior panel 1004, and the molded exterior panel can be made from any of a plurality of appropriate materials for holding, covering, and/or securing a phone 102 (e.g., plastic, fabric, polymer, rubber, etc.). In some embodiments, the magnet arrays 602, 604, 702 can be exposed (e.g., visible), and in other embodiments the magnet arrays 602, 604, 702 can be hidden (e.g., not visible), in accordance with various embodiments of the present invention.

Figure 11:
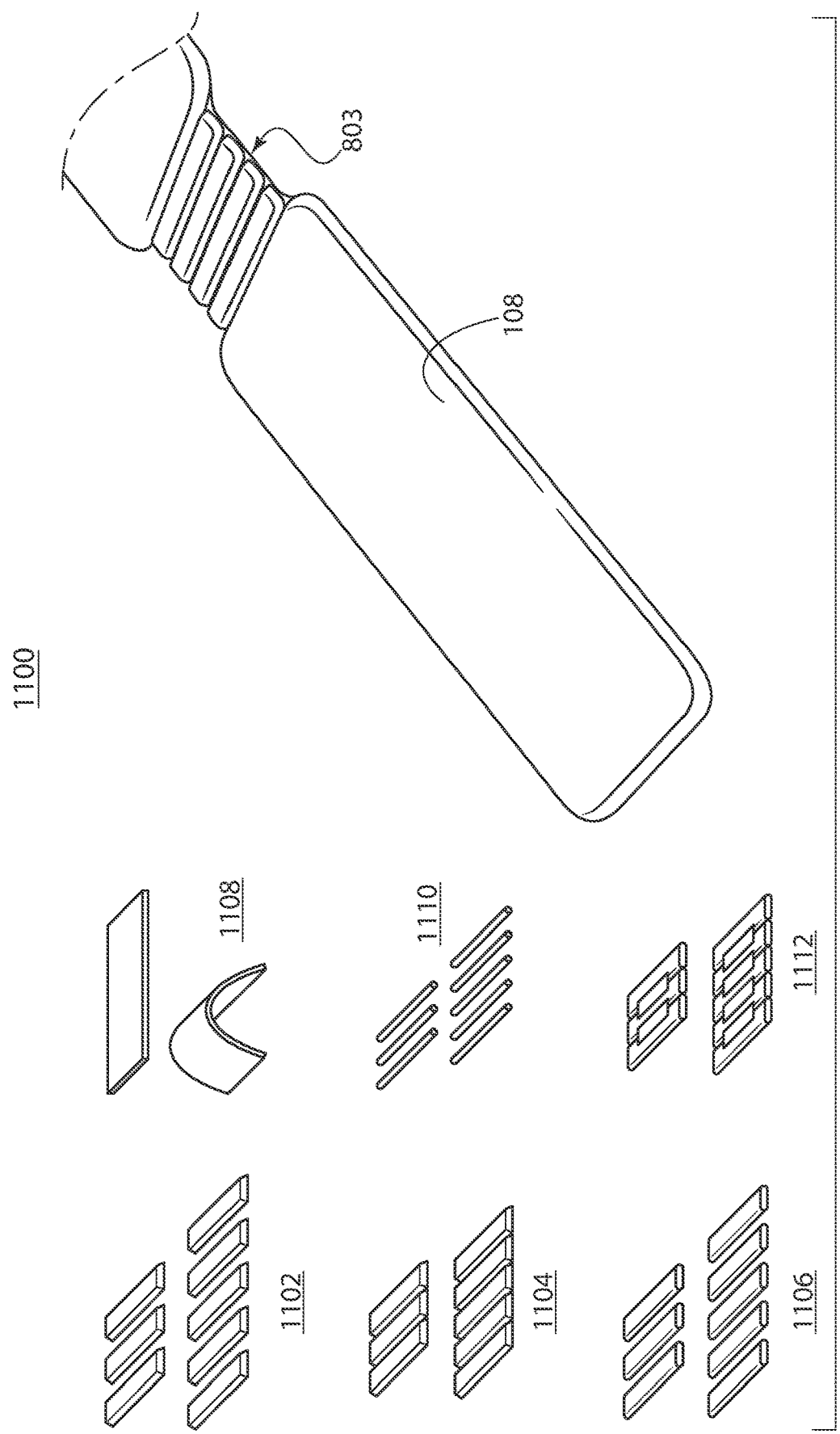
FIG. 11 is a perspective view showing various configurations of link-hinge mechanisms for a separable magnetic personal computing device case and folio, in accordance with aspects of the present invention.

Referring now to FIG. 11, a perspective view 1100 showing various configurations of link-hinge mechanisms for a separable magnetic personal computing device case and folio is illustratively depicted in accordance with aspects of the present invention.

In accordance with various embodiments of the present invention, the link-hinge mechanism 803 can include any of a plurality of components and configurations. For example, in one embodiment, the link-hinge mechanism 803 can include a plurality of equivalently and/or differently sized separate individual links, as shown in block 1102, which are configured to be attached to and to connect the two sides of the folio 108. In another embodiment, the link-hinge mechanism 803 can include a plurality of equivalently sized connected links with sharp squared-off edges, as shown in block 1104, which are configured to be attached to and to connect the two sides of the folio 108. In another embodiment, the link-hinge mechanism 803 can include equivalently and/or differently sized separate individual links with rounded edges, as show in block 1106, which are configured to be attached to and to connect the two sides of the folio 108 in accordance with aspects of the present invention.

In another embodiment, the link-hinge mechanism 803 can include a substantially planar flexible material (e.g., fabric, plastic, rubber, etc.), as shown in block 1108, which is configured to be attached to and to connect the two sides of the folio 108. In another embodiment, the link-hinge mechanism 803 can include a plurality of equivalently and/or differently sized separate individual pins, as shown in block 1110, which are configured to be attached to and to connect the two sides of the folio 108. In another embodiment, the link-hinge mechanism 803 can include differently sized connected links assembled such that the smaller links are connected to two (2) larger links, as shown in block 1112, which are configured to be attached to and to connect the two sides of the folio 108 in accordance with aspects of the present invention.

Figure 12:
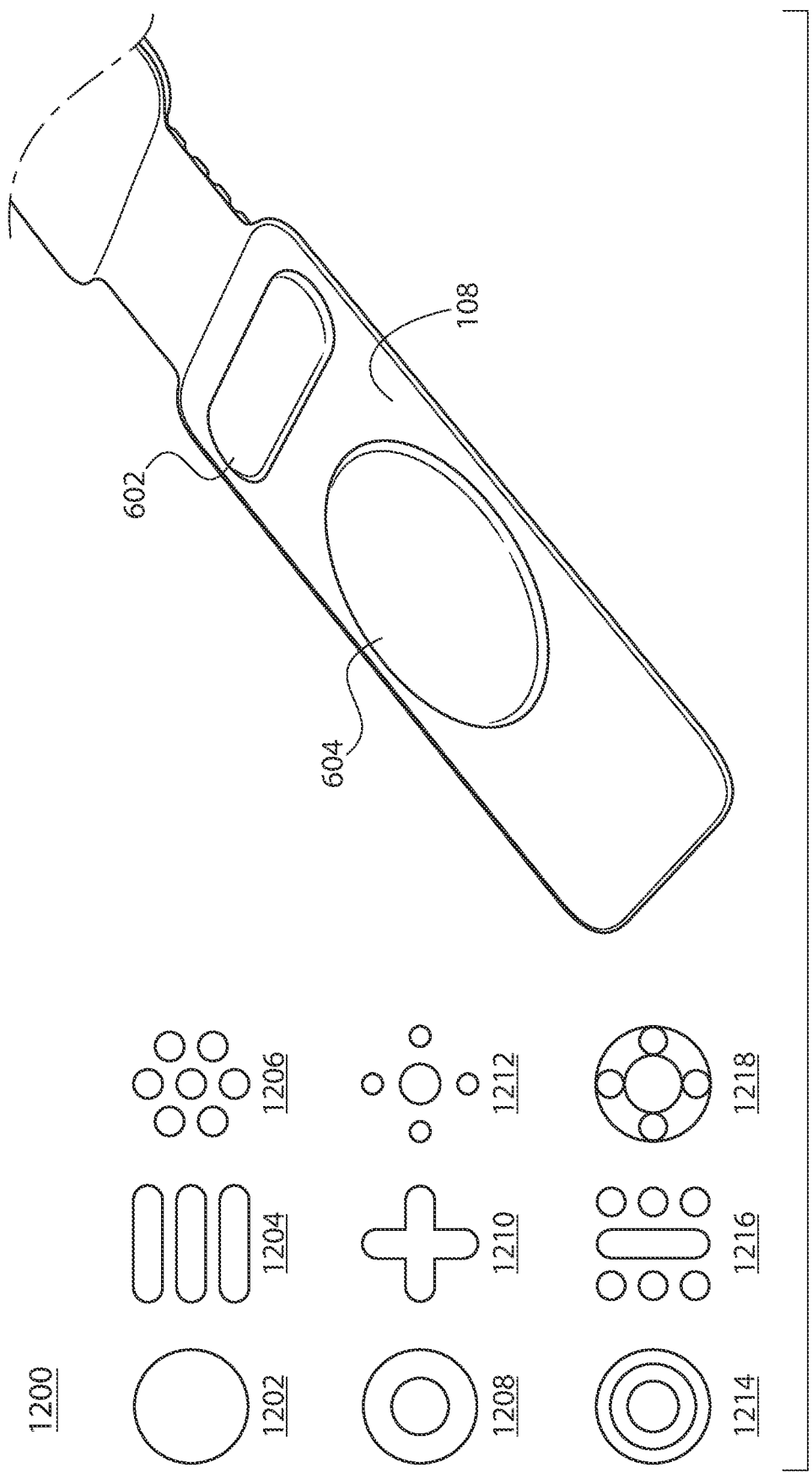
FIG. 12 is a perspective view showing various configurations of folio magnet arrays for a separable magnetic case and folio, in accordance with aspects of the present invention.

Referring now to FIG. 12, a perspective view 1200 showing various configurations of folio magnet arrays for a separable magnetic personal computing device case and folio is illustratively depicted in accordance with aspects of the present invention.

In various embodiments of the present invention, the folio 108 can include one or more magnetic connections 602, 604, which can be a single magnet or a magnet array, in accordance with aspects of the present invention. The upper magnet array 602 and the lower magnet array 604 can include any of a plurality of components and configurations in accordance with aspects of the present invention. For example, the upper magnet array 602 and/or the lower magnet array 604 can be configured as a single disc magnet 1202, a bar magnet array 1204, a uniformly sized multiple disc magnet array 1206, a ring magnet array 1208, a cross magnet array 1210, a differently sized multiple disc magnet array 1212, a ring and disc magnet array 1214, a differently sized and shaped multiple disc and bar magnet array 1216, and a stacked magnet array 1218 in accordance with various embodiments of the present invention.

The upper magnet array 602 and the lower magnet array 604 can be made from any suitable magnetic material, and may be hidden from view or exposed in accordance with aspects of the present invention. The case magnet array 702 (described above with reference to FIG. 7) can include any of a plurality of the above-discussed components and/or configurations 1202, 1204, 1206, 1208, 1210, 1212, 1214, 1216, and/or 1218, can be made from any suitable magnetic material, and can be hidden from view or exposed, in accordance with various aspects of the present invention.

Figure 13:
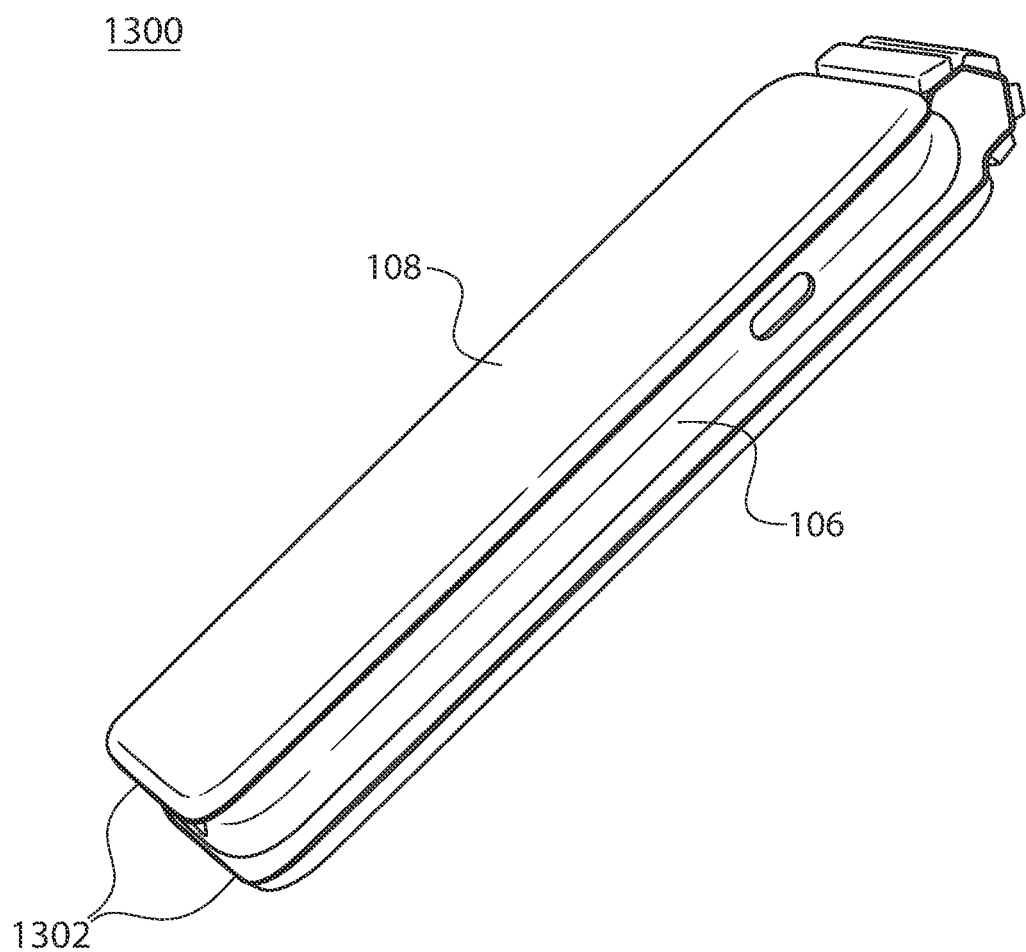
FIG. 13 is a perspective view showing a closed view of assembled components of a separable magnetic personal computing device case and folio including a magnetic closure mechanism with a portable personal computing device, in accordance with an aspect of the present invention.

Referring now to FIG. 13, a perspective view 1300 showing a closed view of assembled components of a separable magnetic personal computing device case and folio including a magnetic closure mechanism with a portable personal computing device is illustratively depicted in accordance with an aspect of the present invention.

In some embodiments, a phone in case 106 can be magnetically attached to a folio 108 including one or more magnet arrays (e.g., 602, 604 of FIG. 6), and the folio 108 can include a magnetic closure mechanism 1302. The magnetic closure mechanism 1302 can include a magnetic connection on a bottom side of a lower edge of one or both sides of the folio 108, and is configured to magnetically secure the sides of the folio 108 in a closed position to prevent the folio 108 from opening without user interaction, in accordance with aspects of the present invention.

Figure 14A:
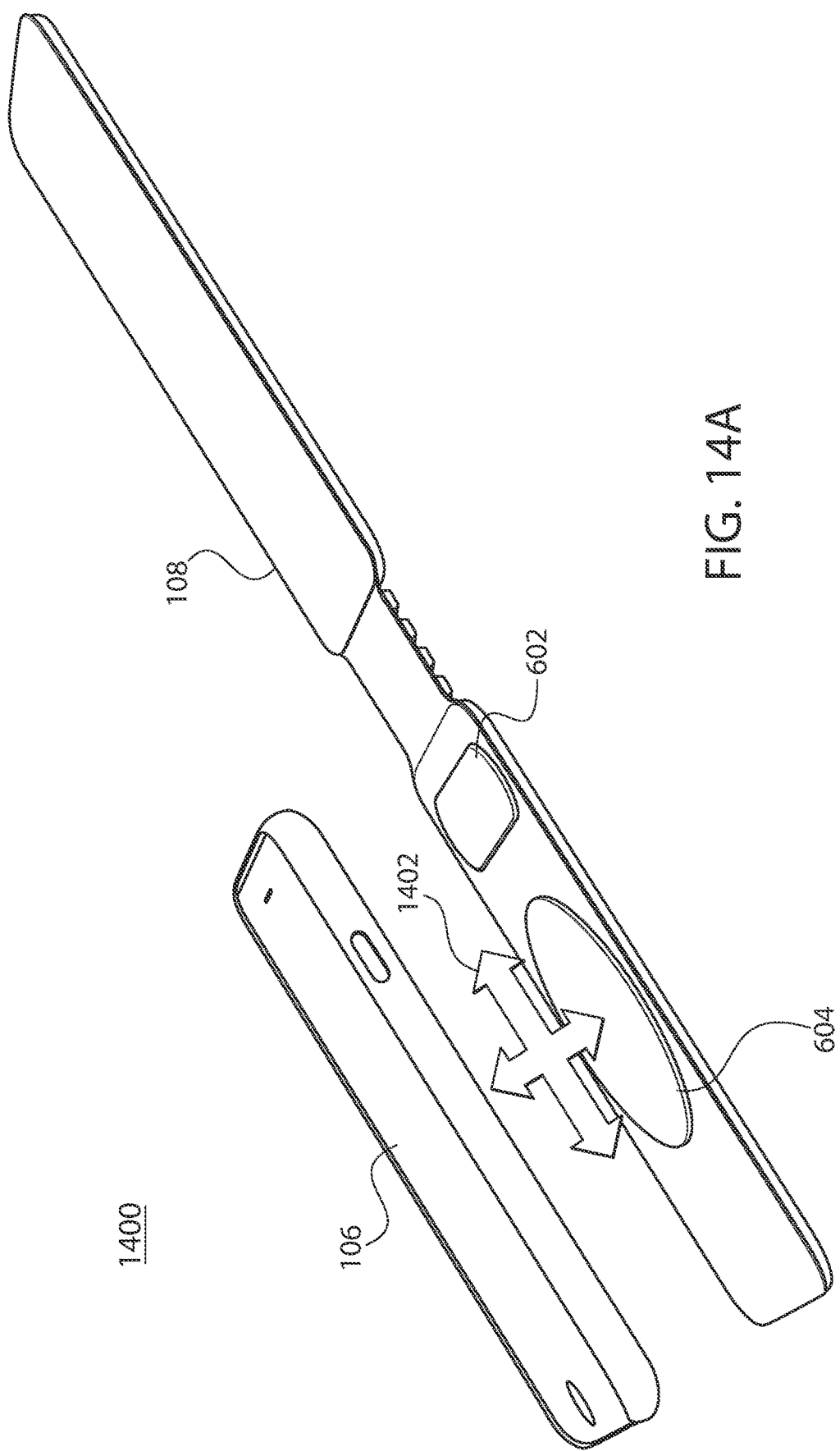
FIG. 14A is a perspective view showing a device and method for magnetic guided seating of a separable magnetic personal computing device case and folio with a portable personal computing device in a disconnected state, in accordance with an aspect of the present invention.

Referring now to FIG. 14A, a perspective view 1400 showing a device and method for magnetic guided seating of a separable magnetic personal computing device case and folio with a portable personal computing device in a disconnected state is illustratively depicted in accordance with an aspect of the present invention.

In accordance with aspects of the present invention, a phone in case 106 can be secured and positioned to the upper magnet array 602 and/or the lower magnet array 604 of a folio 108 using automatic guided magnetic seating 1402. The guided magnetic seating 1402 can be utilized to position the phone in case 106 in an appropriate position relative to the folio 108 such that, for example, the folio 108 can be closed over the phone in case 106 to equally cover and protect both sides of the phone in case 106 in accordance with an aspect of the present invention.

Figure 14B:
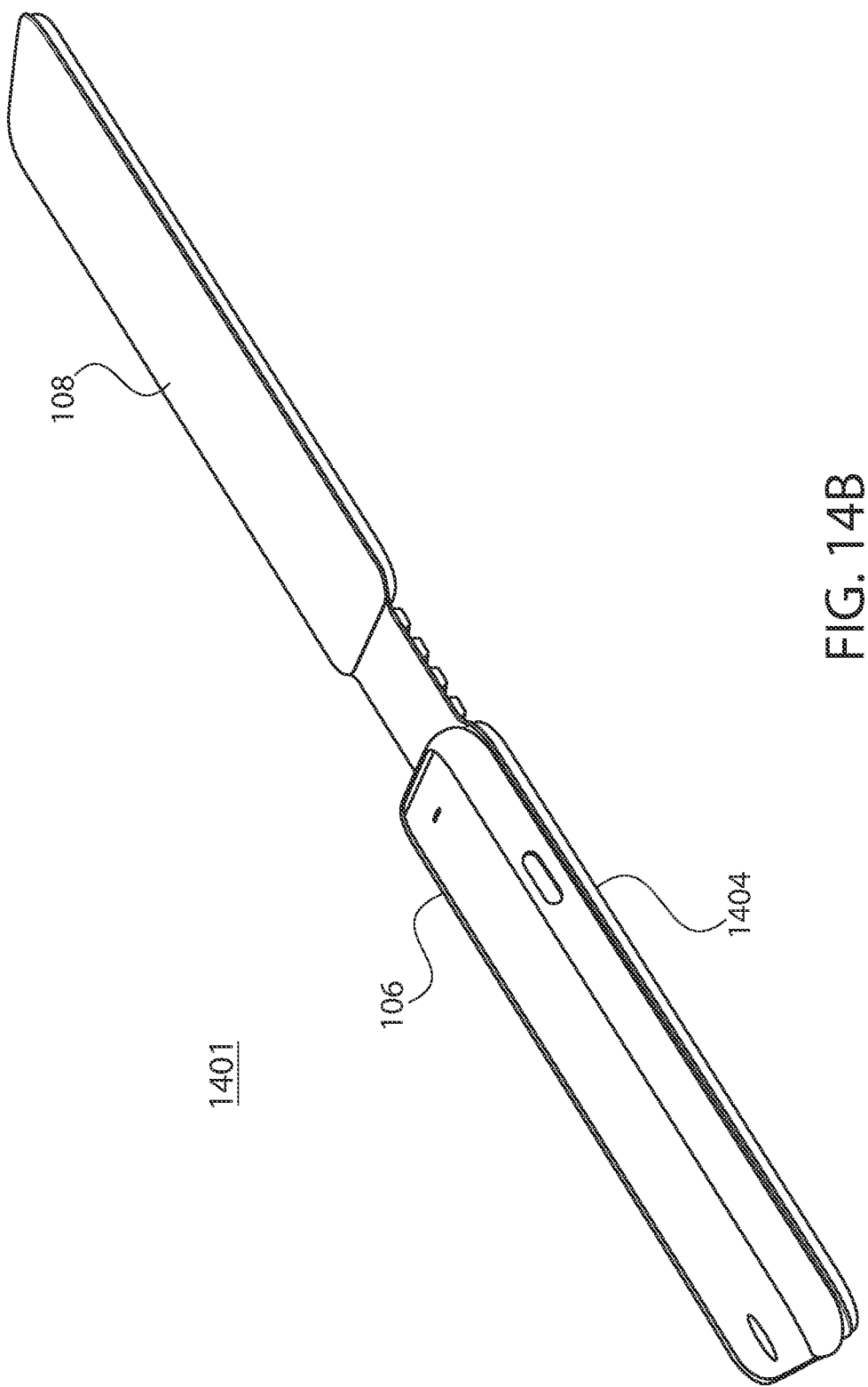
FIG. 14B is a perspective view showing a separable magnetic personal computing device case and folio in a connected state secured using magnetic guided seating, in accordance with an aspect of the present invention.

Referring now to FIG. 14B, a perspective view 1401 showing a separable magnetic personal computing device case and folio in a connected state secured using magnetic guided seating is illustratively depicted in accordance with an aspect of the present invention.

In accordance with aspects of the present invention, a phone in case 106 can be secured and positioned to the upper magnet array 602 and/or the lower magnet array 604 of a folio 108, such that the phone in case 106 is positioned as shown in element 1404. The connected position using magnetic guided seating 1404 is achieved using the automatic guided magnetic seating 1402, as described with reference to FIG. 14A, and the connected position using magnetic guided seating 1404 enables the folio 108 to be closed over the phone in case 106 such that, for example, the folio 108 can be closed over the phone in case 106 to equally cover and protect both sides of the phone in case 106 in accordance with an aspect of the present invention.

Figure 14C:
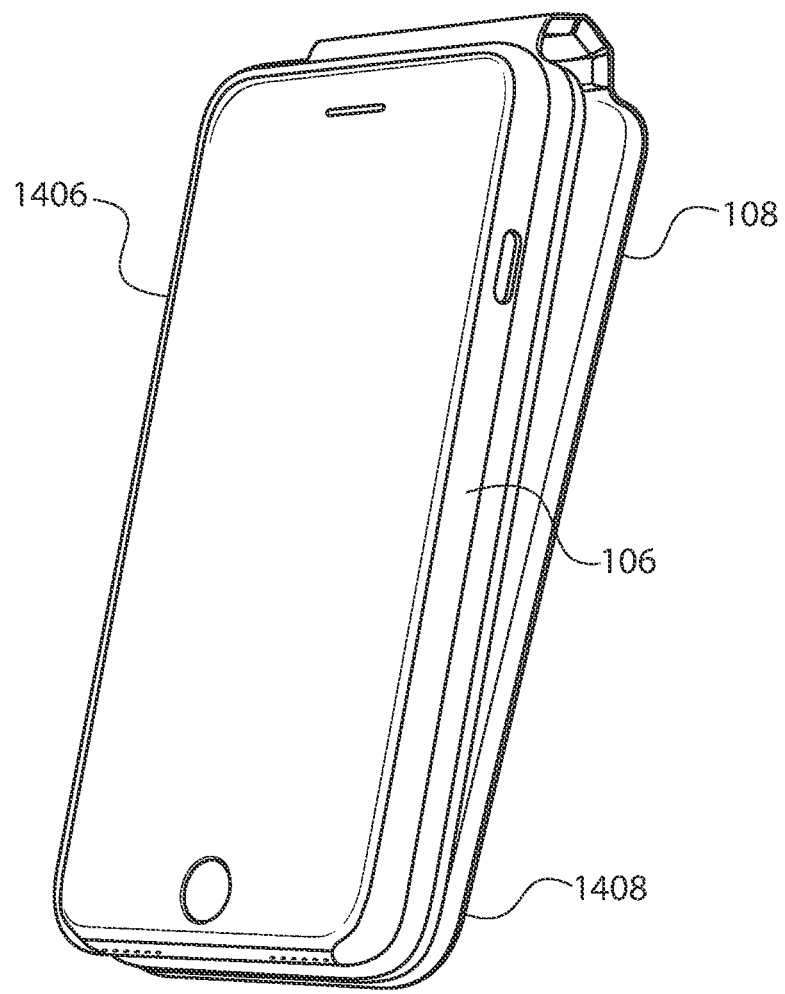
FIG. 14C is a perspective view showing a separable magnetic personal computing device case and folio in a connected state in call mode position secured using magnetic guided seating, in accordance with an aspect of the present invention.

Referring now to FIG. 14C, a perspective view 1403 showing a separable magnetic personal computing device case and folio in a connected state in call mode position secured using magnetic guided seating is illustratively depicted in accordance with an aspect of the present invention.

In accordance with aspects of the present invention, a phone in case 106 can be secured and positioned to the upper magnet array 602 and/or the lower magnet array 604 of a folio 108, such that the phone in case 106 is positioned in call mode position 1406 exposing a front side of the phone in case 106. In some embodiments, the folio 108 can be opened by moving (e.g., flipping) a front side of the folio 108 away from a front side of the phone in case 106 such that the two sides of the folio 108 can be magnetically secured using a magnetic folio panel connection 1408. The magnetic folio panel connection 1408 can include a magnetic connection including one or more magnets and/or magnet arrays positioned on a lower edge of one or both sides of the folio 108, and is configured to magnetically secure the sides of the folio 108 in an opened position to prevent the folio 108 from closing without user interaction in call mode position 1406, in accordance with aspects of the present invention.

Figure 15:
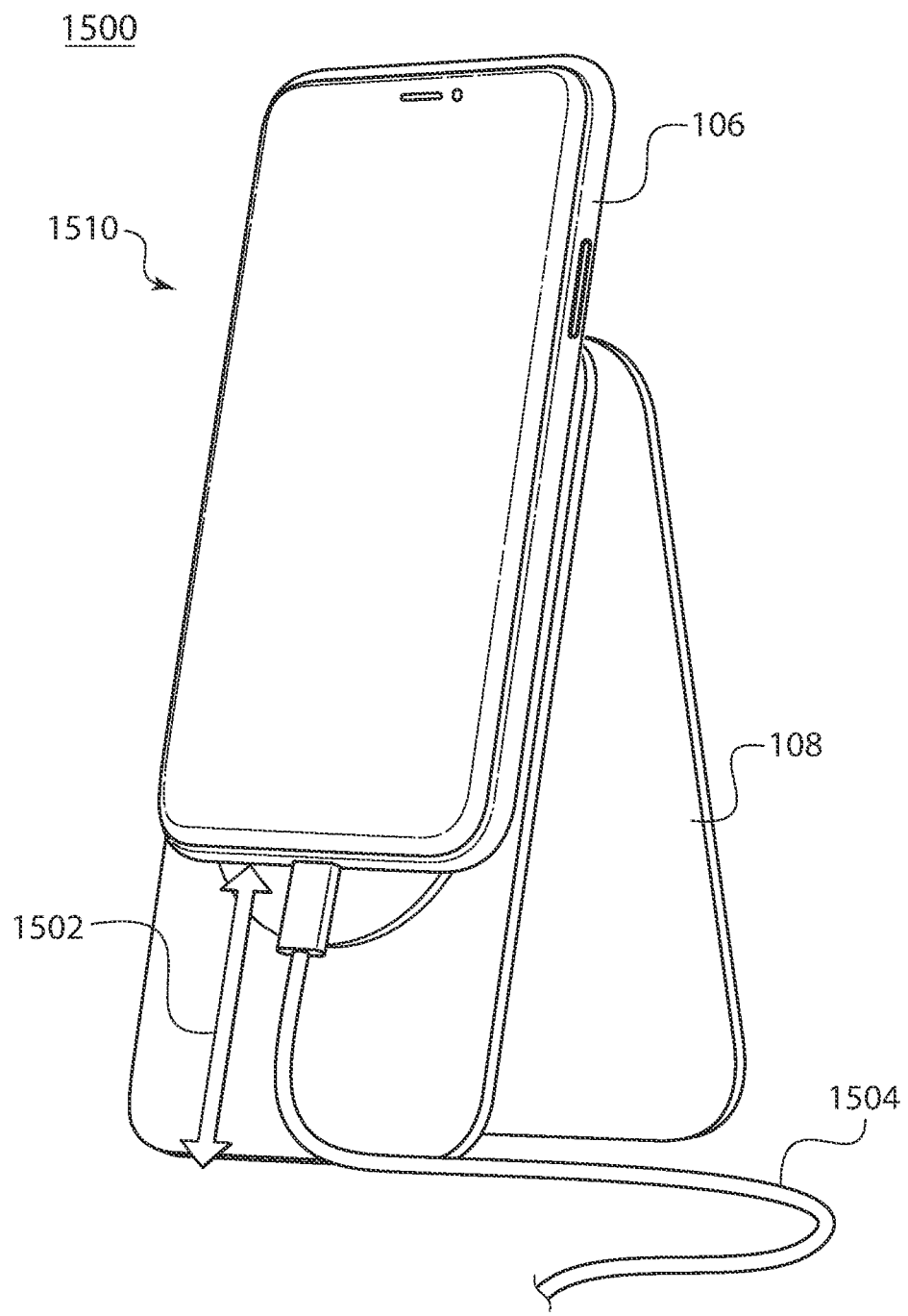
FIG. 15 is a perspective view of a separable magnetic personal computing device case and folio with a portable personal computing device in charging mode position, in accordance with an aspect of the present invention.

Referring now to FIG. 15, a perspective view 1500 of a separable magnetic personal computing device case and folio with a portable personal computing device in charging mode position is illustratively depicted in accordance with an aspect of the present invention.

In accordance with aspects of the present invention, a phone in case 106 can be secured and positioned to the upper magnet array 602 (described above with reference to FIG. 6), and/or the lower magnet array 604 (described above with reference to FIG. 6), of a folio 108 using the case magnet array 702 (described above with reference to FIG. 7), such that the phone in case 106 is positioned in charging mode position 1510. The charging mode position 1510 secures the phone in case 106 to the folio 108 such that a height-adjustable charging cable clearance space 1502 is formed to provide sufficient clearance space for a charging cable 1504 to be plugged into a charging port on the phone in case 106 in accordance with an aspect of the present invention.

Figure 16A:
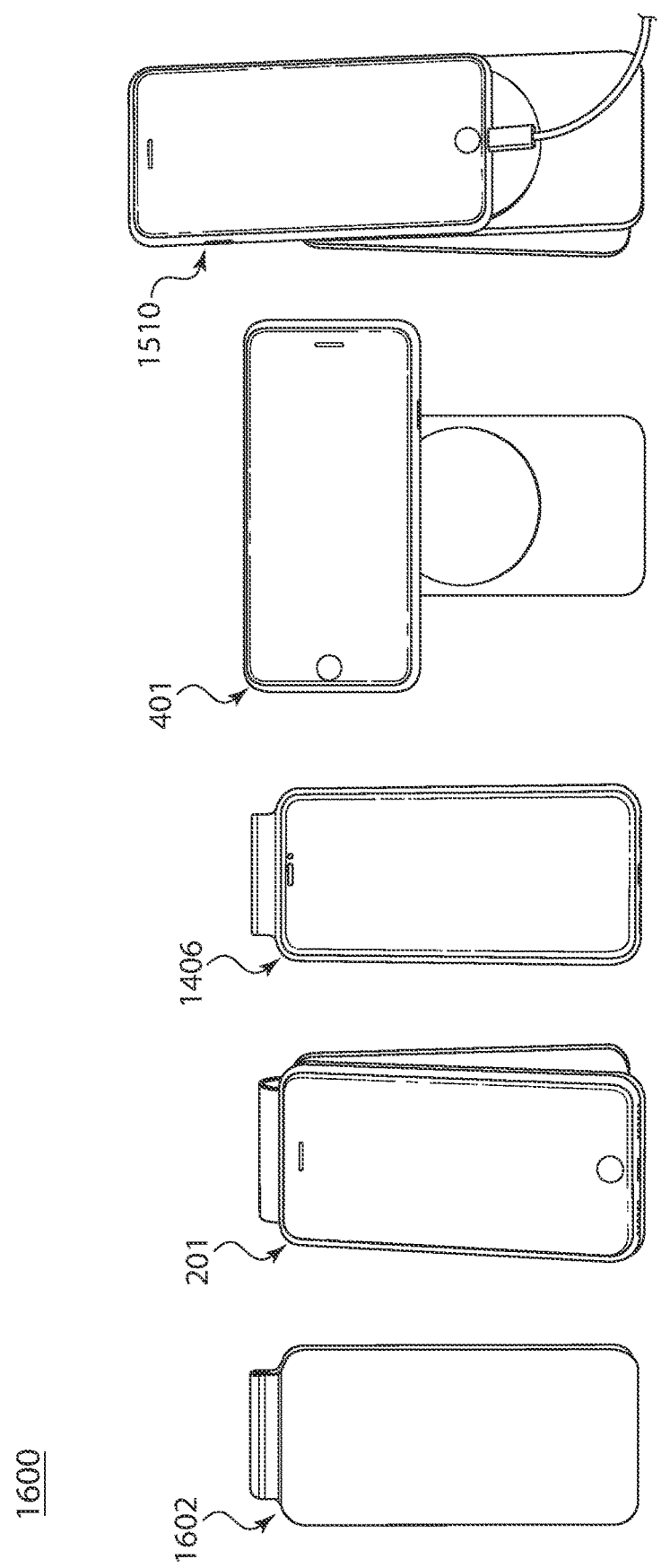
FIG. 16A is a front perspective view showing exemplary attachment and usage configurations for a separable magnetic personal computing device case and folio with a portable personal computing device, in accordance with an aspect of the present invention.

Referring now to FIG. 16A, a front perspective view 1600 showing exemplary attachment and usage configurations for a separable magnetic personal computing device case and folio for a portable personal computing device is illustratively depicted in accordance with an embodiment of the present invention.

In accordance with various embodiments of the present invention, the phone in case 106 can be magnetically attached to a folio 108 in any of a plurality of configurations/positions. These positions can include, but are not limited to a closed folio position 1602, a portrait mode position 201 (described above with reference to FIG. 2), a call mode position 1406 (described above with reference to FIG. 14), a display mode position 401 (described above with reference to FIG. 4), and a charging mode position 1510 (described above with reference to FIG. 15), in accordance with various aspects of the present invention.

Figure 16B:
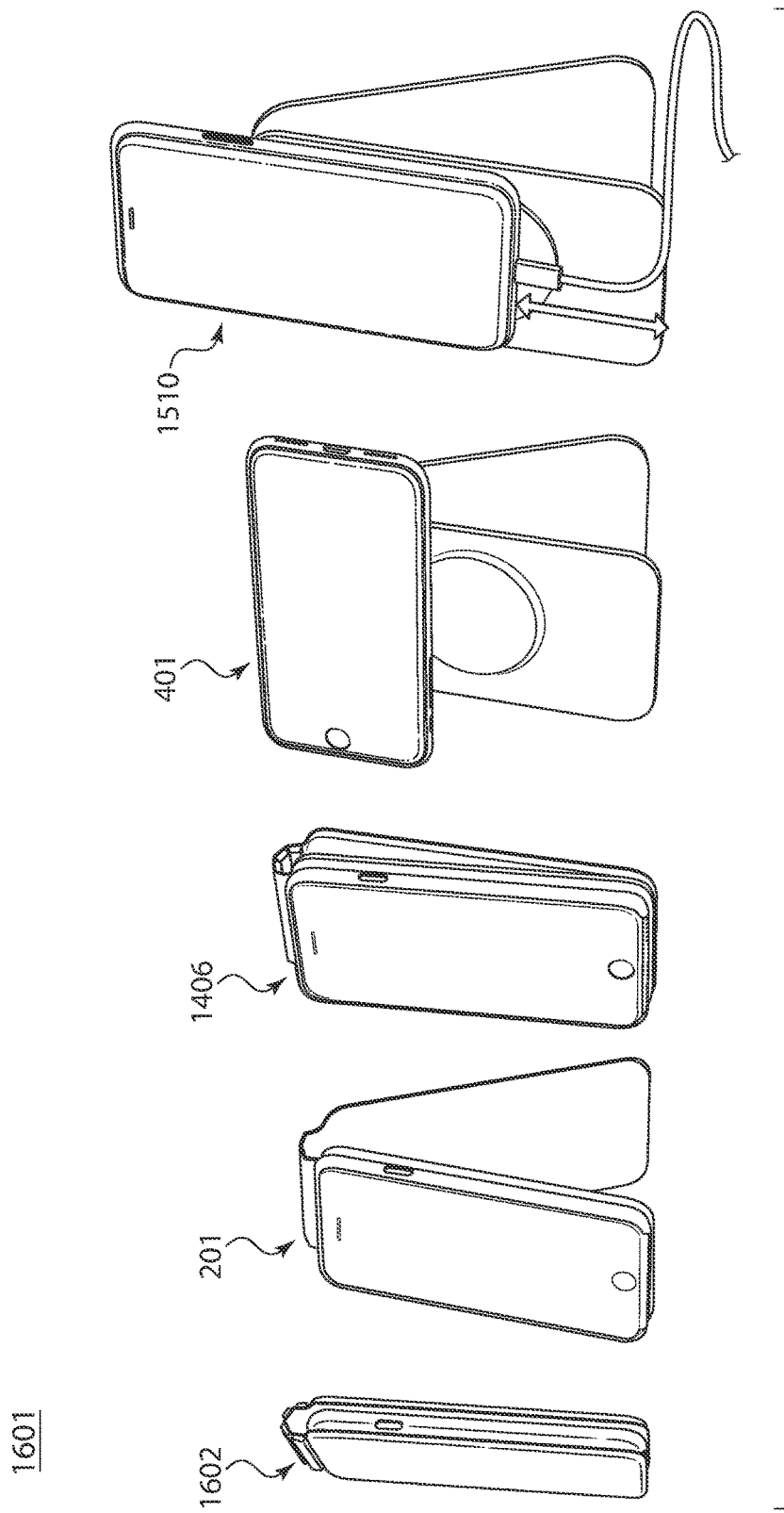
FIG. 16B is an angled perspective view showing exemplary attachment and usage configurations for a separable magnetic personal computing device case and folio with a portable personal computing device, in accordance with an aspect of the present invention.

Referring now to FIG. 16B, an angled perspective view 1601 showing exemplary attachment and usage configurations for a separable magnetic personal computing device case and folio for a portable personal computing device is illustratively depicted in accordance with an embodiment of the present invention.

In accordance with various embodiments of the present invention, the phone in case 106 can be magnetically attached to a folio 108 in any of a plurality of configurations/positions. These positions can include, but are not limited to a closed folio position 1602, a portrait mode position 201 (described above with reference to FIG. 2), a call mode position 1406 (described above with reference to FIG. 14), a display mode position 401 (described above with reference to FIG. 4), and a charging mode position 1510 (described above with reference to FIG. 15), in accordance with various aspects of the present invention.

In accordance with various exemplary embodiments of the present invention, the phone in case 106 can be utilized in any of a plurality of environments, activities, configurations, and/or positions. Exemplary uses include, but are not limited to, utilizing the folio 108 in any viewing position (e.g., portrait, landscape, display) as a stand for any of a plurality of activities (e.g., charging, viewing the screen, etc.). Such uses include, for example, utilizing the phone in the case 106 while attached to the folio as a remote display of a computer screen (e.g., by placing on a desk, table, etc.) while using a connected computer; as a training aide to analyze, for example, a golf, tennis, baseball, etc. swing, yoga positions, a user's stance, etc. (e.g., by placing on a table, bench, ground next to a user, etc.) such that the sensors (e.g., camera, microphone, etc.) of a phone 102 capture the users movement, stance, and/or position; as a stand for watching a video in any viewing position (e.g., by placing on a desk, table, etc.); as a stand for use while cooking (e.g., by placing on kitchen counter to view recipes while cooking); and as a stand for video capturing (e.g., by placing on desk, table, etc.) for hands-free video calls, video filming, etc. in accordance with various embodiments of the present invention.

Figure 17:
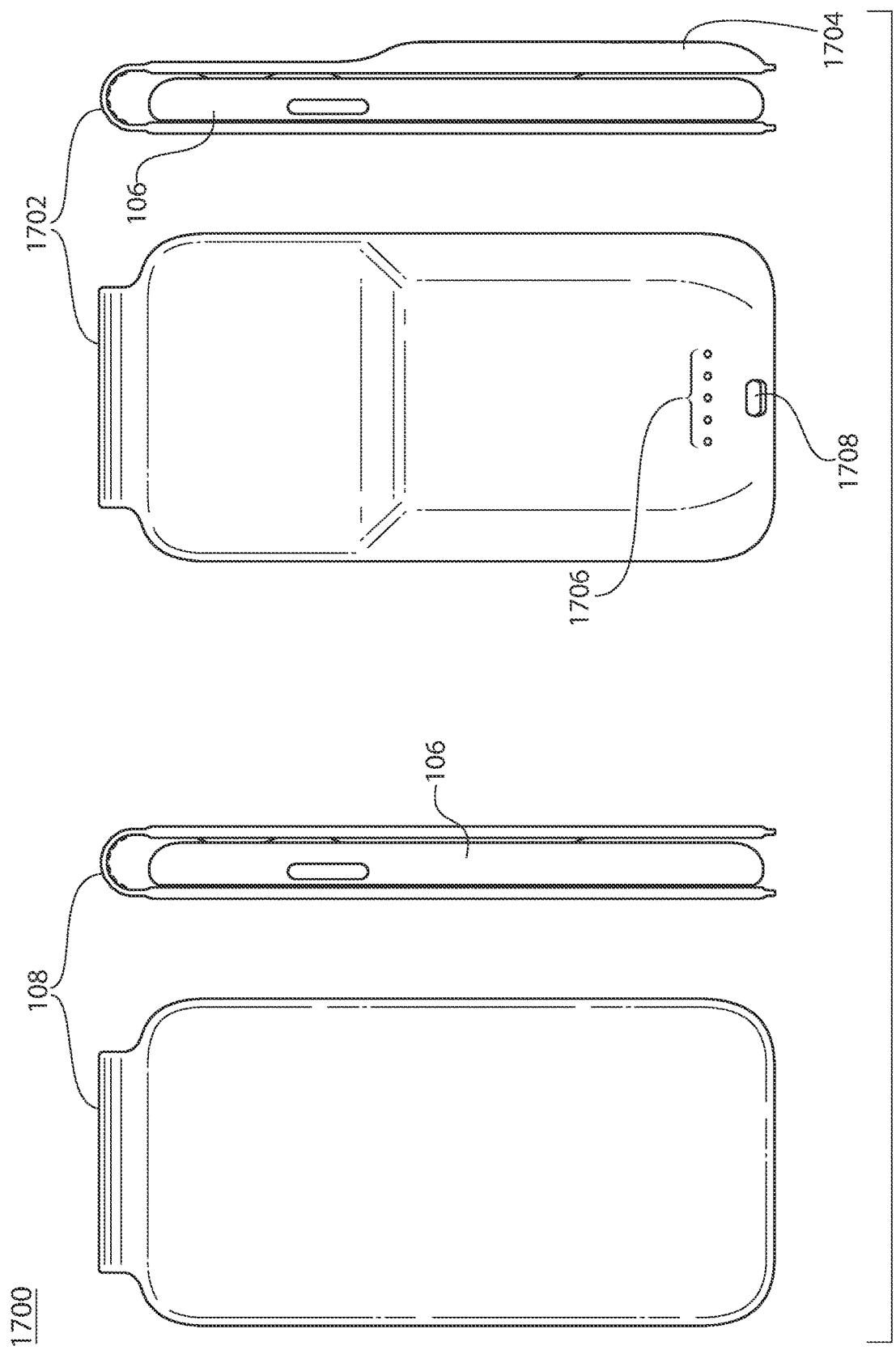
FIG. 17 is a perspective view showing a separable magnetic personal computing device case and folio including an integrated battery and charger for a portable personal computing device, in accordance with an aspect of the present invention.

Referring now to FIG. 17, a perspective view 1700 showing a separable magnetic personal computing device case and folio including an integrated battery and charger for a portable personal computing device is illustratively depicted in accordance with an aspect of the present invention.

In accordance with an embodiment of the present invention, as described above, the folio 108 can be configured to be magnetically attached to a phone in case 106 using magnetic connections (e.g., 602, 604 of FIG. 6, and 702 of FIG. 7). In another embodiment of the present invention, the phone in case 106 can be similarly magnetically attached to a battery-charging folio 1702 configured to charge the phone in case 106 using a wired and/or wireless charging connection to the battery 1704. The battery-charging folio 1702 can include a battery life indicator 1706 and a charging port 1708 configured for charging the battery 1704 and for providing charge from the charging port 1708 for charging the battery 1704, and the charging port 1708 can be utilized to charge any of a plurality of devices using a charging cable (not shown) plugged into the charging port to provide power to any of a plurality of devices in accordance with aspects of the present invention. In some embodiments, the battery 1704 can be charged wirelessly by placing the phone in case 1702 on a wireless charging pad or other appropriate wireless charging device.

Figure 18:
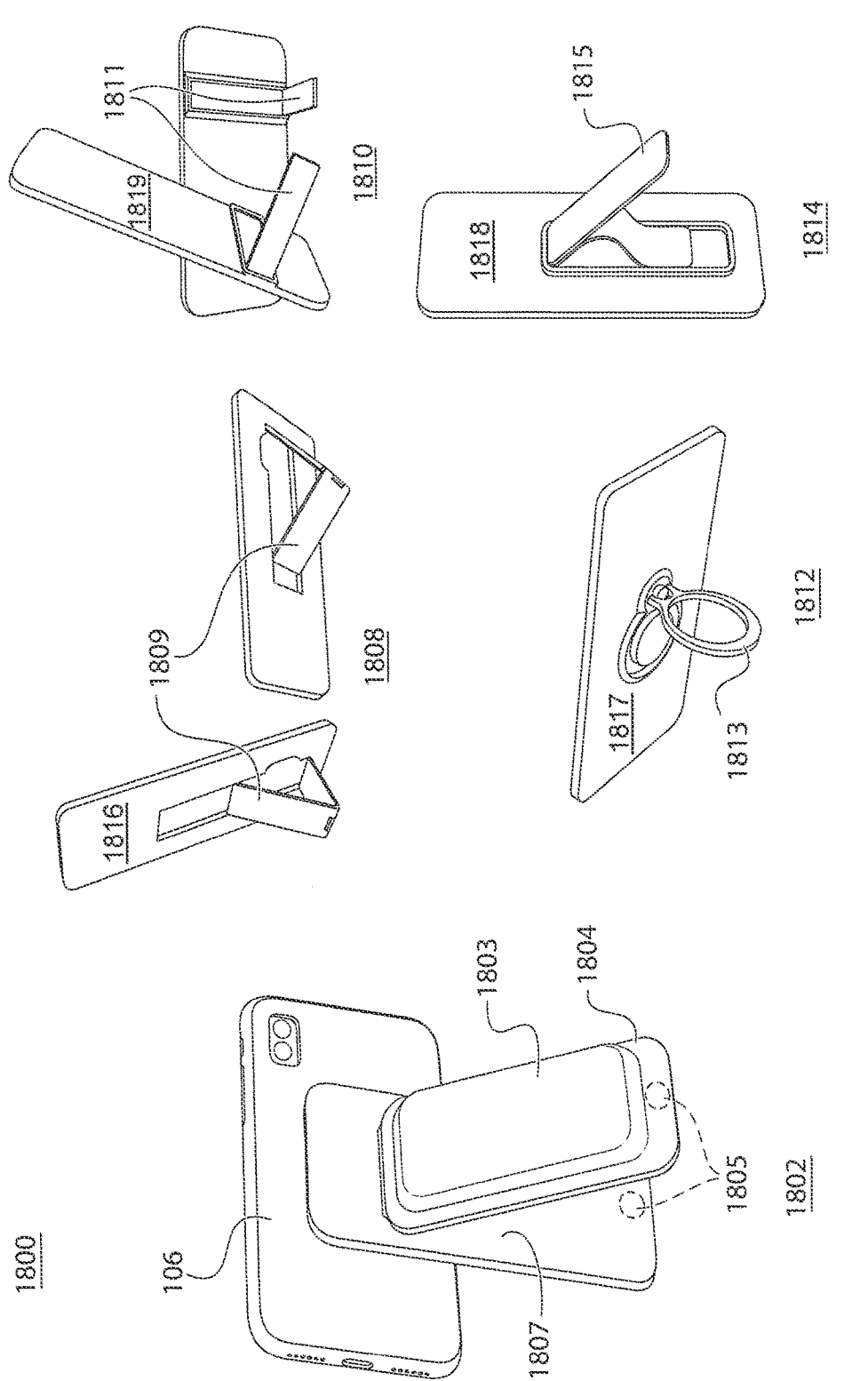
FIG. 18 is a high-level perspective view showing a separable magnetic personal computing device case and magnetic device holder with a kickstand, in accordance with an aspect of the present invention.

Referring now to FIG. 18, high-level perspective views 1800 showing multiple configurations of a separable magnetic personal computing device case and magnetic device holder with a kickstand are illustratively depicted in accordance with an aspect of the present invention.

In accordance with various embodiments of the present invention, the magnetic device holders front support plates 1807, 1816, 1817, 1818, 1819 can include a front plate upper magnet array 602 and a front plate lower magnet array 604 for attaching the phone in case 106 for viewing in any of a variety of attachment configurations, as described in further detail with regard to the magnetic arrays of FIGS. 9, 10, and 12. It is to be appreciated that the magnetic device holders front support plates 1807, 1816, 1817, 1818, 1819 function similarly with the folio 108 and can be used with the magnetic phone case 104 in any of the embodiments described with regard to the folio 108 in accordance with aspects of the present invention. In one embodiment, the kickstand 1804 can be secured to the magnetic device holder front support plate 1807 using a magnetic closure mechanism 1805.

In some embodiments, the magnetic device holders 1802, 1808, 1810, 1812, 1814 can include a kickstand support structure 1804, 1809, 1811, 1813, 1815, respectively, in accordance with aspects of the present invention. In one embodiment, the kickstand 1804 can include a battery backup 1803, which can be charged wirelessly or by a wired charging connection, and which further charges the phone in case 106 wirelessly while the phone in case 106 is connected to the magnetic device holder front support plate 1807. Although the kickstand support structures 1804, 1809, 1811, 1813, 1815 are shown as particular shapes and sizes for illustrative purposes, it is to be appreciated that any suitable kickstand structure can be utilized with the magnetic device holders front support plates 1807, 1816, 1817, 1818, 1819 in accordance with aspects of the present invention.

It is to be appreciated that while the above non-limiting uses of the present invention are presented as examples for clarity, the present invention can be utilized for any of a plurality of other environments, activities, and/or positions in accordance with various embodiments of the present invention.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

Having described preferred embodiments of a system and method for a separable magnetic personal computing device case and folio (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An apparatus for securing a personal computing device, comprising:
a folio including two or more folio magnetic arrays positioned at least at a top portion and a middle portion of the folio, the folio magnetic arrays including an upper folio magnet array disposed at a top portion of the folio and a lower folio magnet array disposed at a middle portion of the folio, wherein magnets in the lower folio magnet array are arranged in one or more of a plurality of configurations including one or more of a single disc magnet, a bar magnet array, a uniformly sized multiple disc magnet array, a ring magnet array, a cross magnet array, a differently sized and shaped multiple disc and bar magnet array, or a stacked magnet array; and
a personal computing device case including one or more case magnetic connections configured to magnetically attach the case to the folio in any of a plurality of viewing positions, the plurality of viewing positions comprising a portrait mode and a landscape mode.

2. The apparatus of claim 1, wherein the one or more case magnetic connections are magnet arrays comprising two or more magnets configured to magnetically connect the folio and the case.

3. The apparatus of claim 1, wherein the plurality of viewing positions is selected from the group consisting of a closed mode, the portrait mode, a display mode, the landscape mode, a call mode, and a charging mode.

4. The apparatus of claim 1, wherein the folio comprises two equivalently sized sides connected at a top edge of the sides using a hinge mechanism, the sides being a front side and a rear side.

5. The apparatus of claim 4, wherein the folio is configured to support the case in an open position by flipping a front side of the folio over the hinge and placing the folio in an A-frame position on a surface using a bottom edge of each of the two sides such that exposed faces of the folio are in an upwardly angled position relative to the surface and magnetically attaching the case to the folio using the magnetic connections.

6. The apparatus of claim 4, wherein the hinge mechanism includes a hinge-spacing mechanism configured to form a clearance space to accommodate a width of the case when the folio is in a closed position.

7. The apparatus of claim 4, wherein the hinge mechanism is a link-hinge mechanism with links in the link-hinge mechanism being arranged in any of a plurality of configurations, the plurality of configurations comprising a plurality of equivalently or differently sized separate individual links with sharp squared-off edges, a plurality of equivalently sized connected links, a plurality of equivalently or differently sized separate individual links with rounded edges, a plurality of equivalently and/or differently sized separate individual pins, a plurality of differently sized connected links, or a substantially planar flexible material single link mechanism.

8. The apparatus of claim 1, wherein the folio further comprises a battery disposed on a back side of the folio, the battery being configured to transfer power to the portable computing device using a wireless or wired charging connection.

9. The apparatus of claim 1, wherein the plurality of viewing positions includes a charging mode forming a clearance space for a charging cable connection between a bottom edge of the case and a surface by placing the case on an upper magnet array of the folio.

10. The apparatus of claim 1, wherein the folio includes magnetic connections disposed on a bottom edge of a front side and a bottom edge of a back side of the folio, the magnetic connections being configured for magnetically securing the front side and the back side of the folio in a closed position over the case.

11. An apparatus for securing a personal computing device, comprising:
a folio including two or more folio magnetic array connections, the folio magnetic array connections comprising two or more magnets configured to magnetically connect the folio and a personal computing device case, the folio magnet arrays including an upper folio magnet array disposed at a top portion of the folio and a lower folio magnet array disposed at a middle portion of the folio, the personal computing device case including one or more case magnetic connections configured to magnetically attach the case to the folio in any of a plurality of viewing positions, the plurality of viewing positions comprising a portrait mode and a landscape mode,
wherein the folio comprises two equivalently sized sides connected at a top edge of the sides using a hinge mechanism, the sides being a front side and a rear side, the hinge mechanism including a hinge-spacing mechanism configured to form a clearance space to accommodate a width of the case when the folio is in a closed position.

12. The apparatus of claim 11, wherein the folio includes magnetic connections disposed on a bottom edge of a front side and a bottom edge of a back side of the folio, the magnetic connections being configured for magnetically securing the front side and the back side of the folio in a closed position over the case.

13. The apparatus of claim 11, wherein the hinge mechanism is a link-hinge mechanism with links in the link-hinge mechanism being arranged in any of a plurality of configurations, the plurality of configurations comprising a plurality of equivalently or differently sized separate individual links with sharp squared-off edges, a plurality of equivalently sized connected links, a plurality of equivalently or differently sized separate individual links with rounded edges, a plurality of equivalently and/or differently sized separate individual pins, a plurality of differently sized connected links, or a substantially planar flexible material single link mechanism.

* * * * *